US008994633B2

(12) United States Patent
Hosaka et al.

(10) Patent No.: US 8,994,633 B2
(45) Date of Patent: Mar. 31, 2015

(54) VIDEO PROCESSING CIRCUIT, VIDEO PROCESSING METHOD, LIQUID CRYSTAL DISPLAY DEVICE, AND ELECTRONIC APPARATUS

(75) Inventors: Hiroyuki Hosaka, Matsumoto (JP); Hidehito Iisaka, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 961 days.

(21) Appl. No.: 13/005,136

(22) Filed: Jan. 12, 2011

(65) Prior Publication Data

US 2011/0181795 A1 Jul. 28, 2011

(30) Foreign Application Priority Data

Jan. 25, 2010 (JP) ................................ 2010-012885

(51) Int. Cl.
*G09G 3/36* (2006.01)
*G06F 3/041* (2006.01)

(52) U.S. Cl.
CPC ...... *G09G 3/3611* (2013.01); *G09G 2310/0235* (2013.01); *G09G 2320/0209* (2013.01); *G09G 2320/0271* (2013.01); *G09G 2340/16* (2013.01)
USPC ............................................ 345/98; 345/205

(58) Field of Classification Search
USPC .................................... 345/87–104, 204–205
See application file for complete search history.

(56) References Cited

U.S. PATENT DOCUMENTS

2006/0018630 A1 * 1/2006 Jacovi et al. .................... 386/83
2009/0243983 A1 * 10/2009 Ohashi et al. .................. 345/89

FOREIGN PATENT DOCUMENTS

JP A-6-34965 2/1994
JP A-2009-69608 4/2009

* cited by examiner

*Primary Examiner* — Kenneth Bukowski
(74) *Attorney, Agent, or Firm* — Oliff PLC

(57) ABSTRACT

A video processing circuit for a liquid crystal panel is disclosed. The video processing circuit includes: a risk boundary detecting unit configured to detect a risk boundary that is a portion of boundaries each between a first pixel whose applied voltage that is specified by an input video signal is below a first voltage and a second pixel whose applied voltage exceeds a second voltage higher than the first voltage, the risk boundary being determined by a tilt azimuth of the liquid crystal; an identification unit configured to identify a first pixel that is surrounded by the risk boundary at least two edges, in first pixels adjacent to the boundaries; and a replacement unit configured to replace, a voltage to be applied to a liquid crystal element corresponding to the first pixel, the voltage being specified by the input video signal, with a predetermined third voltage.

6 Claims, 26 Drawing Sheets

SCANNING LINE DRIVING CIRCUIT

VIDEO PROCESSING CIRCUIT (1) VIDEO SIGNAL
(BEFORE PROCESSING) θb=45 DEGREES (2) RISK BOUNDARY DETECTION (3) IDENTIFICATION OF REPLACEMENT OBJECT (4) REPLACEMENT PROCESS
(ANOTHER EXAMPLE 2: LOW-VOLTAGE SIDE AND HIGH-VOLTAGE SIDE PIXELS)

VIDEO PROCESSING CIRCUIT, VIDEO PROCESSING METHOD, LIQUID CRYSTAL DISPLAY DEVICE, AND ELECTRONIC APPARATUS

BACKGROUND

1. Technical Field

The present invention relates to a technique for reducing display defects in a liquid crystal panel.

2. Related Art

Liquid crystal panels each include: a pair of substrates, in one of which pixel electrodes are arranged in matrix so as to correspond to respective pixels, and in the other of which a common electrode is disposed in common for the pixels; and liquid crystal interposed between the pixel electrode and the common electrode. In such a configuration, when a voltage according to a gray-scale level is applied and held between the pixel electrode and the common electrode, the alignment state of the liquid crystal is defined for each pixel, whereby the transmittance or reflectance is controlled. Accordingly, it can be said in the configuration that, among electric fields acting on liquid crystal molecules, only a component in a direction from the pixel electrode toward the common electrode (or the opposite direction), that is, a component in a direction perpendicular to the substrate surface (vertical direction) contributes to display control.

As a pixel pitch is narrowed for miniaturization and higher resolution as in recent years, an electric field generated between pixel electrodes next to each other, that is, an electric field in a direction parallel to the substrate surface (lateral direction) is generated, and the influence thereof is becoming non-negligible. For example, when a lateral electric field is applied to liquid crystal that should be driven by a vertical electric field as in the vertical alignment (VA) mode or the twisted nematic (TN) mode, an alignment defect of liquid crystal (reverse tilt domain) occurs, causing a display defect.

For reducing the influence of the reverse tilt domain, a technique for devising the structure of a liquid crystal panel by, for example, defining a light shielding layer (an opening) according to the shape of a pixel electrode (refer to JP-A-6-34965 (FIG. 1), for example) has been proposed. Moreover, for example, a technique for clipping a video signal having a set value or more based on the determination that a reverse tilt domain is generated when an average luminance value calculated from a video signal is equal to or less than a threshold value (refer to JP-A-2009-69608 (FIG. 2), for example) has been proposed.

However, the technique for reducing the reverse tilt domains with the structure of the liquid crystal panel has such drawbacks that the aperture ratio is likely to decrease, and that the technique cannot be applied to an existent liquid crystal panel that has been manufactured without devising its structure. On the other hand, the technique for clipping a video signal having a set value or more has such a drawback that the brightness of an image to be displayed is uniformly limited to the set value.

SUMMARY

An advantage of some aspects of the invention is to provide a technique for reducing reverse tilt domains while eliminating these drawbacks.

An aspect of the invention is directed to a video processing circuit for a liquid crystal panel including a first substrate in which a pixel electrode is disposed corresponding to each of a plurality of pixels, a second substrate in which a common electrode is disposed, and liquid crystal interposed between the first substrate and the second substrate, the pixel electrode, the liquid crystal, and the common electrode constituting each of liquid crystal elements, the video processing circuit inputting a video signal that specifies a voltage to be applied to the liquid crystal element for each of the pixels and defining the voltage to be applied to each of the liquid crystal elements based on a processed video signal, including: a risk boundary detecting unit configured to detect a risk boundary that is a portion of boundaries each between a first pixel whose applied voltage that is specified by an input video signal is below a first voltage and a second pixel whose applied voltage exceeds a second voltage higher than the first voltage, the risk boundary being determined by a tilt azimuth of the liquid crystal; an identification unit configured to identify a first pixel that is surrounded by the risk boundary at least two edges, in first pixels adjacent to the boundaries; and a replacement unit, configured to replace, when a voltage to be applied to the identified first pixel and specified by the video signal is below a third voltage lower than the first voltage, a voltage to be applied to a liquid crystal element corresponding to the first pixel, the voltage being specified by the input video signal, with a predetermined third voltage. According to the aspect of the invention, it is sufficient to perform not a process for the entire image corresponding to one frame but a process for detecting a risk boundary between pixels. Therefore, compared to a configuration that analyzes images corresponding to two or more frames to detect movement, it is possible to suppress an increase in size and complexity of a video processing circuit. Further, according to the aspect of the invention, since there is no need to change the structure of a liquid crystal panel, the aperture ratio is not lowered. Moreover, the aspect of the invention can be applied to an existent liquid crystal panel that has been manufactured without devising its structure.

In the aspect of the invention, the third voltage may be a voltage that gives an initial tilt angle to the liquid crystal element and is preferably about 1.5 volts. In the aspect of the invention, it is preferable that the tilt azimuth is a direction from one end of a long axis of a liquid crystal molecule on a side of the pixel electrode toward the other end of the liquid crystal molecule, as viewed in plan from the pixel electrode side toward the common electrode. This is because a reverse tilt domain is generated by a lateral electric field generated between pixel electrodes.

Other aspects of the invention can be conceptualized as, in addition to the video processing circuit, a video processing method, a liquid crystal display device, and an electronic apparatus including the liquid crystal display device.

BRIEF DESCRIPTION OF THE DRAWINGS

The invention will be described with reference to the accompanying drawings, wherein like numbers reference like elements.

FIGS. 6A and 63 are explanatory views of initial alignment in the liquid crystal panel in the VA mode.

DESCRIPTION OF EXEMPLARY EMBODIMENTS

Embodiment

Hereinafter, an embodiment of the invention will be described with reference to the drawings.

Figure 1:
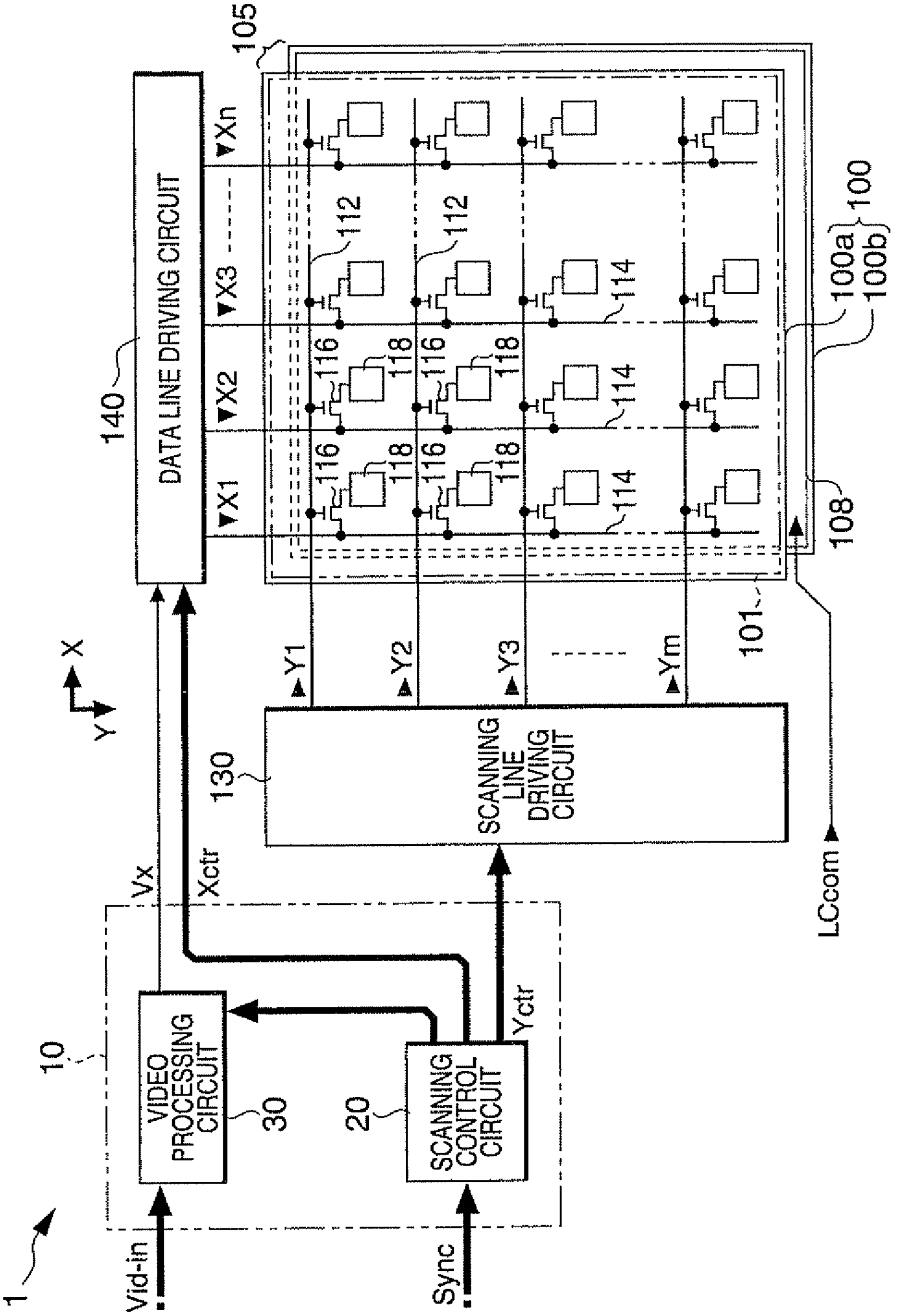
FIG. 1 shows a liquid crystal display device to which a video processing circuit according to an embodiment is applied.

FIG. 1 is a block diagram showing the overall configuration of a liquid crystal display device to which a video processing circuit according to the embodiment is applied.

As shown in the drawing, the liquid crystal display device 1 has a control circuit 10, a liquid crystal panel 100, a scanning line driving circuit 130, and a data line driving circuit 140. To the control circuit 10, a video signal Vid-in is supplied from a higher-level device in synchronization with a synchronizing signal Sync. The video signal Vid-in is digital data that specifies a gray-scale level of each pixel in the liquid crystal panel 100 and supplied in a scanning order according to a vertical scanning signal, a horizontal scanning signal, and a dot clock signal (none of them are shown) included in the synchronizing signal Sync.

Although the video signal Vid-in specifies a gray-scale level, it can safely be said that the video signal Vid-in specifies a voltage to be applied to a liquid crystal element because the voltage to be applied to a liquid crystal element is determined depending on a gray-scale level.

The control circuit 10 is composed of a scanning control circuit 20 and a video processing circuit 30. The scanning control circuit 20 generates various kinds of control signals and controls each of the portions in synchronization with the synchronizing signal Sync. The video processing circuit 30, which will be described in detail later, processes the video signal Vid-in in digital form to output an analog data signal Vx.

The liquid crystal panel 100 includes an element substrate (first substrate) 100*a* and a counter substrate (second substrate) 100*b* bonded together with a given gap, and liquid crystal 105 interposed therebetween to be driven by an electric field in the vertical direction.

On a facing surface of the element substrate 100*a* relative to the counter substrate 100*b*, a plurality of m rows of scanning lines 112 are disposed along the horizontal (X) direction in the drawing, and a plurality of n columns of data lines 114 are disposed along the vertical (Y) direction. Each of the scanning lines 112 and each of the data lines 114 are disposed so as to maintain electrical insulation therebetween.

In the embodiment, for identifying each of the scanning lines 112, the scanning lines are sometimes referred to as the scanning lines in first, second, third, . . . , (m−1)th, and mth rows in this order from the top in the drawing. Similarly, for identifying each of the data lines 114, the data lines are sometimes referred to as the data lines in first, second, third, . . . , (n−1)th, and nth columns in this order from the left in the drawing.

A set of an n-channel TFT 116 and a transparent pixel electrode 118 having a rectangular shape is further disposed on the element substrate 100*a* so as to correspond to each intersection of the scanning lines 112 and the data lines 114. A gate electrode of the TFT 116 is connected to the scanning line 112, a source electrode thereof is connected to the data line 114, and a drain electrode thereof is connected to the pixel electrode 118.

On the other hand, on a facing surface of the counter substrate 100*b* relative to the element substrate 100*a*, a transparent common electrode 108 is disposed over the entire surface. A voltage LCcom is applied to the common electrode 108 by a not-shown circuit.

In FIG. 1, since the facing surface of the element substrate 100*a* is on the rear side of the paper, the scanning lines 112, the data lines 114, the TFTs 116, and the pixel electrodes 118 disposed on the facing surface should be indicated by broken lines. However, they are indicated by solid lines to make the drawing easier to read.

Figure 2:
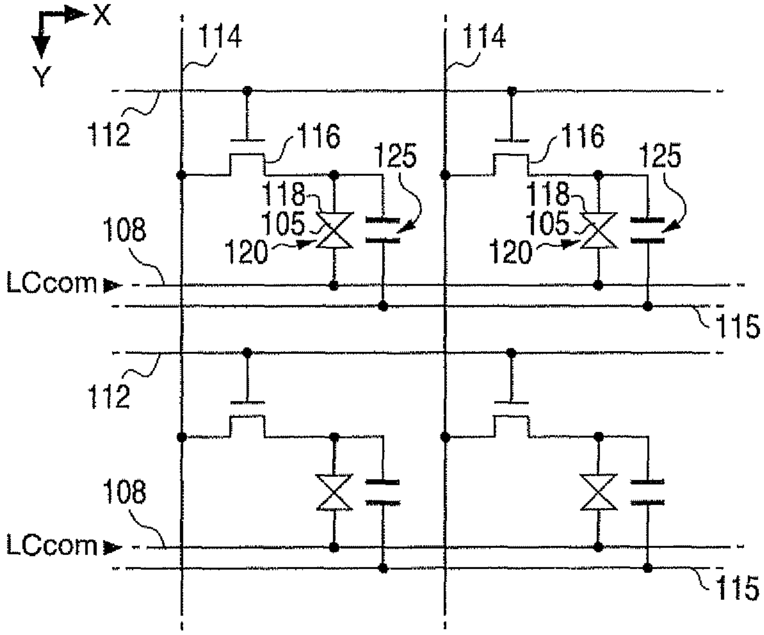
FIG. 2 shows equivalent circuits of liquid crystal elements in the liquid crystal display device.

Equivalent circuits in the liquid crystal panel 100 are as shown in FIG. 2, in which liquid crystal elements 120 each having the liquid crystal 105 interposed between the pixel electrode 118 and the common electrode 108 are arranged so as to correspond to each of the intersections of the scanning lines 112 and the data lines 114.

Although not shown in FIG. 1, an auxiliary capacitor (storage capacitor) 125 is actually disposed in parallel with the liquid crystal element 120 in the equivalent circuit of the liquid crystal panel 100 as shown in FIG. 2. The auxiliary capacitor 125 is connected at one end to the pixel electrode 118 and connected at the other end to a capacitor line 115 in common. The capacitor line 115 is held at a constant voltage in terms of time.

In such a configuration, when the scanning line 112 is at H level, the TFT 116 whose gate electrode is connected to that scanning line is turned on, so that the pixel electrode 118 is connected to the data line 114. Therefore, if a data signal of a voltage according to a gray scale is supplied to the data line 114 when the scanning line 112 is at H level, the data signal is applied to the pixel electrode 118 through the TFT 116 in the on state. Although the TFT 116 is turned off when the scanning line 112 is at L level, the voltage applied to the pixel electrode is held by the capacitance of the liquid crystal element 120 and the auxiliary capacitor 125.

As has been well known, in the liquid crystal element 120, the alignment state of the liquid crystal 105 changes depending on an electric field generated by the pixel electrode 118 and the common electrode 108. Therefore, the liquid crystal element 120 has a transmittance according to an applied holding voltage if the liquid crystal element is of a transmissive type.

Since a transmittance changes in each of the liquid crystal elements 120 in the liquid crystal panel 100, the liquid crystal element 120 corresponds to a pixel. An arrangement region of these pixels serves as a display region 101. In the embodiment, it is assumed that the liquid crystal 105 is VA mode liquid crystal, and that the normally black mode is employed in which the liquid crystal element 120 has the lowest transmittance, a black state, when no voltage is applied.

Figure 5A:
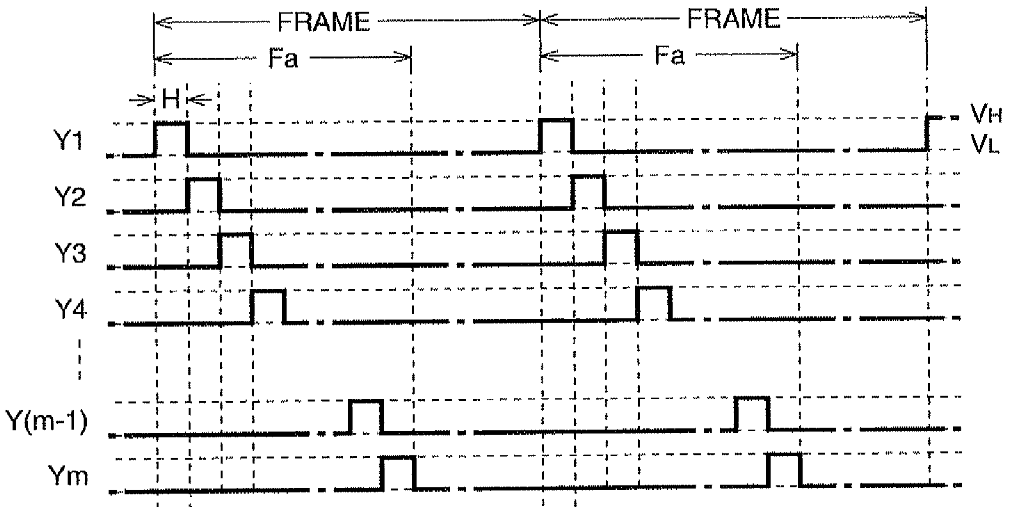
FIGS. 5A and 5B show display operation in the liquid crystal panel.

The scanning line driving circuit 130 supplies scanning signals Y1, Y2, Y3, . . . , and Ym to the scanning lines 112 in the first, second, third, . . . , and mth rows over a frame according to a control signal Yctr from the scanning control circuit 20. In other words, the scanning line driving circuit 130 selects the scanning line 112 in the order of the first, second, third, . . . , and mth rows as shown in FIG. 5A. Moreover, the scanning line driving circuit 130 sets a scanning signal to the selected scanning line to a selection voltage $V_H$ (H level), and sets a scanning signal to the other scanning lines to a non-selection voltage $V_L$ (L level).

The "frame" used herein means a cycle in which the video signals Vid-in corresponding to a unit of video image are supplied. When the frequency of the vertical scanning signal included in the synchronizing signal Sync is 60 Hz, the frame is 16.7 milliseconds that is the reciprocal of 60 Hz. In the embodiment, since the scanning lines 112 in the first, second, third, . . . , and mth rows are sequentially selected over a frame, the liquid crystal panel 100 is driven at the same speed as the video signal Vid-in. In the embodiment, therefore, a period required for displaying an image corresponding to a unit of video image by the liquid crystal panel 100 coincides with a frame.

The data line driving circuit 140 samples, as data signals X1 to Xn, the data signal Vx supplied from the video processing circuit 30 for the data lines 114 in the first to nth columns according to a control signal Xctr from the scanning control circuit 20.

As for voltage in the description, a not-shown ground potential serves as the reference of zero voltage, except for the applied voltage to the liquid crystal element 120, unless otherwise specified. This is because the applied voltage to the liquid crystal element 120 is the potential difference between the voltage LCcom of the common electrode 108 and the pixel electrode 118, and therefore, the applied voltage is distinguished from the other voltages.

For preventing the degradation of the liquid crystal 105 due to the application of DC component, AC driving is carried out for the liquid crystal element 120. Specifically, a positive voltage on the high-potential side and a negative voltage on the low-potential side, relative to a voltage Vcnt as the center of amplitude, are alternately switched from frame to frame, for example, and applied to the pixel electrode 118. In such an AC drive in the embodiment, the frame inversion scheme is employed in which the writing polarities for the liquid crystal elements 120 are the same in one frame. In this case, the voltage LCcom applied to the common electrode 108 may be considered as substantially the same voltage as the voltage Vcnt.

Figure 4A:
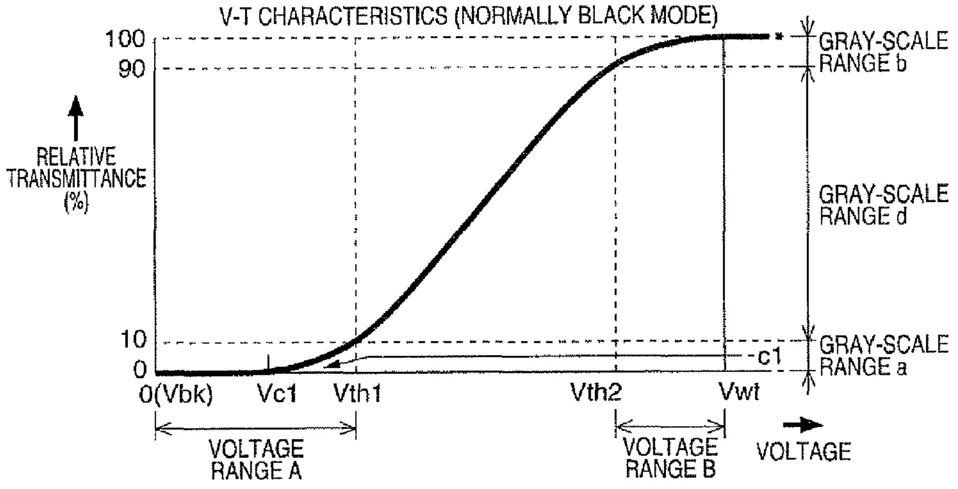
FIGS. 4A and 4B show V-T characteristics of a liquid crystal panel constituting the liquid crystal display device.

Since the normally black mode is employed in the embodiment, the relationship between the voltage to be applied to the liquid crystal element 120 and the transmittance thereof is represented by V (voltage)–T (transmittance) characteristics as shown in FIG. 4A. Therefore, for causing the liquid crystal element 120 to have a transmittance according to a gray-scale level specified by the video signal Vid-in, it should be enough to apply a voltage according to the gray-scale level to the liquid crystal element.

However, when the voltage to be applied to the liquid crystal element 120 is simply defined according to the gray-scale level specified by the video signal Vid-in, a display defect caused by a reverse tilt domain sometimes occurs.

Figure 13A:
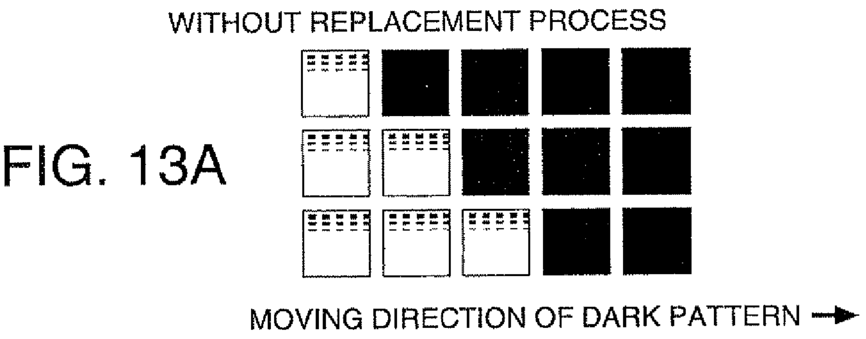
FIGS. 13A and 13B show suppression of reverse tilt by the video processing circuit.

An example of the display defect caused by a reverse tilt domain will be described. As shown in FIG. 13A for example, in an image represented by the video signals Vid-in, when a black pattern composed of continuous black pixels on a background composed of white pixels moves in the right direction, one kind of tailing phenomenon that a pixel that should be changed from a black pixel to a white pixel at the left edge portion (tail edge of movement) of the black pattern does not change to a white pixel appears because of the generation of a reverse tilt domain.

Viewed from another perspective, in FIG. 13A, can also be said that when a white pattern composed of continuous white pixels on a background of black pixels moves in the right direction, a pixel that should be changed from a black pixel to a white pixel at the right edge portion (leading edge of movement) of the white pattern does not change to a white pixel because of the generation of a reverse tilt domain.

In FIG. 13A, only a portion of the image is illustrated for ease of description.

One of the causes of the display defect caused by a reverse tilt domain is considered as follows: when liquid crystal molecules interposed in the liquid crystal element 120 change from an unstable state to an alignment state according to the applied voltage by the movement of an image, the alignment of the liquid crystal molecules is disturbed by the influence of a lateral electric field; and thereafter, the liquid crystal molecules are hard to go into an alignment state according to the applied voltage.

Here, the condition under which the liquid crystal molecules are affected by the lateral electric field is a case where the potential difference between pixel electrodes next to each other is great, which means a case where a dark pixel at black level (or close to black level) and a bright pixel at white level (or close to white level) are next to each other in an image to be displayed.

It is defined that the dark pixel means a pixel of the liquid crystal element 120 whose applied voltage is within a voltage range A of from a voltage Vbk or more at black level in the normally black mode to below a voltage Vth1 (first voltage). For convenience, a transmittance range (gray-scale range) of the liquid crystal element whose applied voltage is within the voltage range A is defined as "a".

It is defined that the bright pixel means a pixel of the liquid crystal element 120 whose applied voltage is within a voltage range B of from a voltage Vth2 (second voltage) or more to a voltage Vwt or less at white level in the normally black mode. For convenience, a transmittance range (gray-scale range) of the liquid crystal element whose applied voltage is within the voltage range B is defined as "b".

In the normally black mode, it may be considered that the voltage Vth1 is an optical threshold voltage causing the relative transmittance of a liquid crystal element to be 10%, while the voltage Vth2 is an optical saturation voltage causing the relative transmittance of a liquid crystal element to be 90%.

On the other hand, when liquid crystal molecules are unstable, the applied voltage to a liquid crystal element is below Vc (third voltage). When the applied voltage to a liquid crystal element is below Vc, an anchoring force of a vertical electric field due to the applied voltage is weak compared to an anchoring force due to an alignment film. Therefore, the alignment state of the liquid crystal molecules is likely to be disturbed by a small external factor. Further, even when the applied voltage becomes Vc or more thereafter, and the liquid crystal molecules attempt to tilt according to the applied voltage, it takes time for the liquid crystal molecules to respond. Conversely, it can be said that if the applied voltage is Vc or more, the liquid crystal molecules start to tilt (transmittance starts to change) according to the applied voltage, and therefore, the alignment state of the liquid crystal molecules is stable. In other words, the voltage Vc is lower than the voltage Vth1 defined in terms of transmittance.

When thinking in this way, it can be said that the pixel whose liquid crystal molecules are unstable before change is in a situation where a reverse tilt domain is likely to be generated by the influence of a lateral electric field when a dark pixel and a bright pixel are next to each other by the movement of an image. However, when a study is made in view of the initial alignment state of liquid crystal molecules, a reverse tilt domain may or may not be generated depending on the positional relationship between a dark pixel and a bright pixel.

These cases will now be studied below.

Figure 6A:
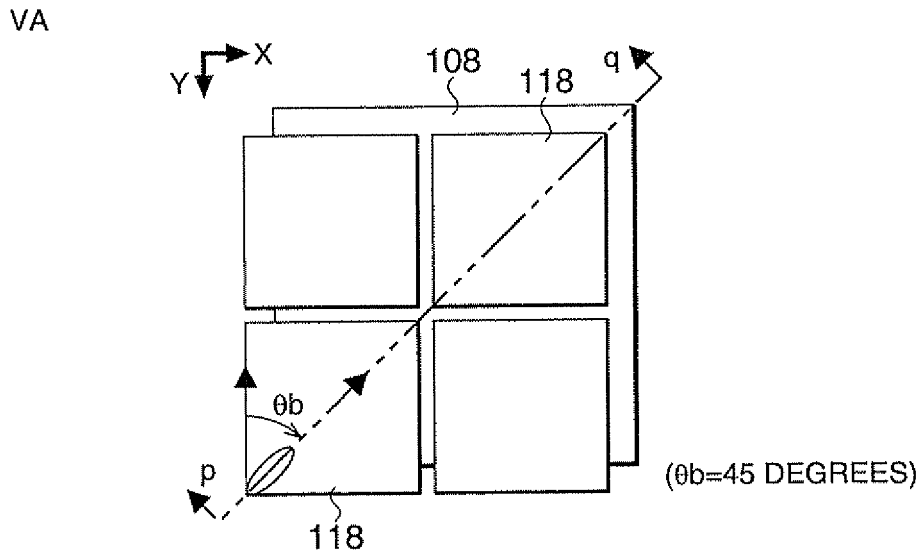
Figure 6B:
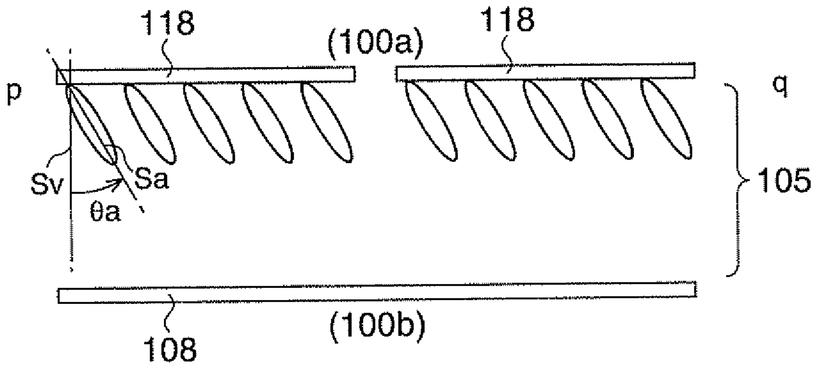

FIG. 6A shows 2×2 pixels next to each other in the vertical and horizontal directions in the liquid crystal panel 100. FIG. 6B is a simplified cross-sectional view of the liquid crystal panel 100 cut at a vertical plane including line p-q in FIG. 6A, especially showing a state of liquid crystal molecules.

As shown in the drawings, it is assumed that the VA-mode liquid crystal molecules are initially aligned at a tilt angle of θa and a tilt azimuthal angle of θb (=45 degrees) in a state where the potential difference (the applied voltage to the liquid crystal element) between the pixel electrode 118 and the common electrode 108 is zero.

In this case, since a reverse tilt domain is generated due to the lateral electric field between the pixel electrodes 118 as described above, the behavior of liquid crystal molecules on the side of the element substrate 100*a* where the pixel electrodes 118 are disposed is an issue. Therefore, the tilt azimuthal angle and tilt angle of a liquid crystal molecule are defined based on the side of the pixel electrode 118 (the element substrate 100*a*).

Specifically as shown in FIG. 63, the tilt angle θa is defined as an angle made by a long axis Sa of a liquid crystal molecule based on a substrate normal line Sv when, with one end of the long axis Sa of the liquid crystal molecule on the pixel electrode 118 side as a reference, the other end of the long axis on the common electrode 108 side tilts. On the other hand, the tilt azimuthal angle θb is defined as an angle made by a substrate vertical plane (vertical plane including the line p-q) including the long axis Sa of the liquid crystal molecule and the substrate normal line Sy based on a substrate vertical plane along the Y-direction as the arrangement direction of the data line 114. Here, the tilt azimuthal angle θb is, as viewed in plan from the side of the pixel electrode 118 toward the common electrode 108, an angle defined in a clockwise fashion from the upper direction of the screen (the opposite direction from the Y-direction) to a direction (upper right direction in FIG. 6A) toward the other end of the long axis of the liquid crystal molecule with the one end thereof as a starting point.

Similarly, as viewed in plan from the side of the pixel electrode 118, a direction (upper right direction in FIG. 6A) from the one end of the liquid crystal molecule on the pixel electrode side toward the other end is referred to as a downstream side of the tilt azimuth for convenience, whereas a direction (lower left direction in FIG. 6A) from the other end toward the one end is referred to as an upstream side of the tilt azimuth for convenience.

Figures 7A, 7B, 7C:
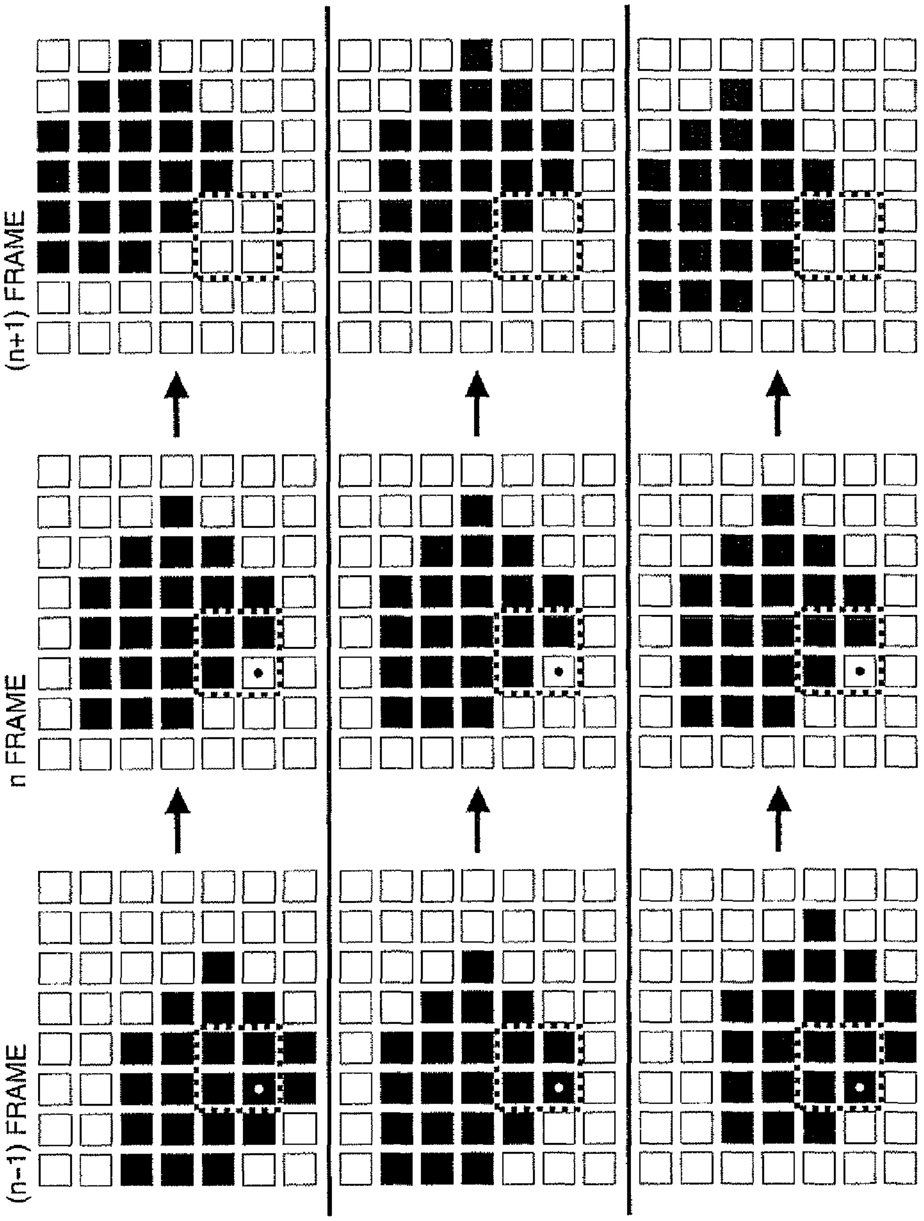
FIGS. 7A to 7C explain the movement of an image in the liquid crystal panel.
Figure 8A:
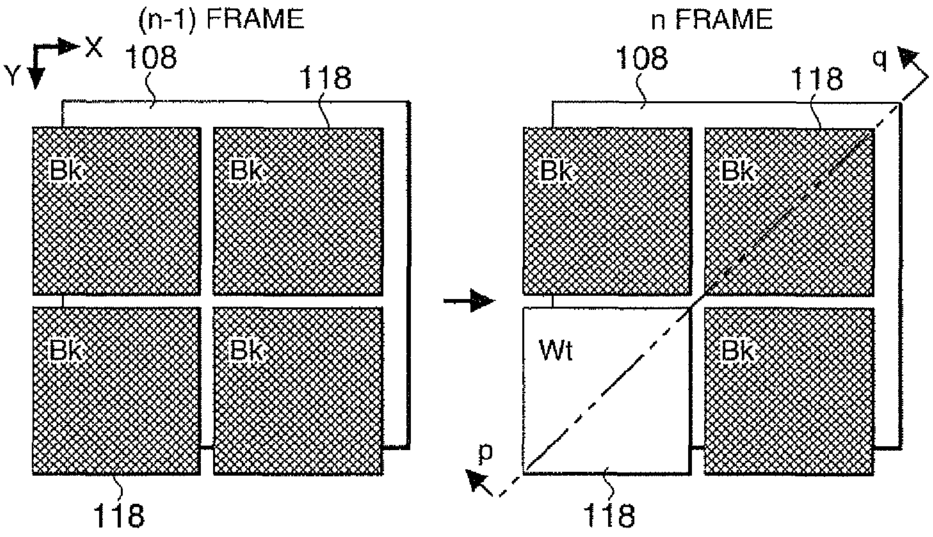
FIGS. 8A to 8C are explanatory views of reverse tilt that occurs in the liquid crystal panel.

In the liquid crystal panel 100 using the liquid crystal 105 with such an initial alignment, attention is focused on 2×2=4 pixels surrounded by broken lines as shown in FIG. 7A, for example. FIG. 7A shows a case where a pattern composed of pixels at black level (black pixels), on a background of a region composed of pixels at white level (white pixels), moves in the upper right direction pixel by pixel every frame. In this case as shown in FIG. 8A, in a state where all 2×2=4 pixels are black pixels in an (n−1) frame, only one pixel at the lower left corner is changed to a white pixel in an n frame.

In the normally black mode as described above, the applied voltage that is the potential difference between the pixel electrode 118 and the common electrode 108 is greater in a white pixel than in a black pixel. Therefore, in the lower left pixel to be changed from black to white, liquid crystal molecules attempt to tilt in a direction (horizontal direction of a substrate surface) perpendicular to an electric field direction, attempting to change from a state indicated by solid lines to a state indicated by broken lines in FIG. 8B.

However, the potential difference generated in the gap between the pixel electrode 118 (Wt) of a white pixel and the pixel electrode 118 (Bk) of a black pixel is nearly equal to the potential difference generated between the pixel electrode 118 (Wt) of a white pixel and the common electrode 108, and in addition, the gap between the pixel electrodes is narrower than the gap between the pixel electrode 118 and the common electrode 108. Accordingly, when compared in terms of intensity of electric field, the lateral electric field generated in the gap between the pixel electrode 118 (Wt) and the pixel electrode 118 (Bk) is stronger than the vertical electric field generated in the gap between the pixel electrode 118 (Wt) and the common electrode 108.

Figure 5B:
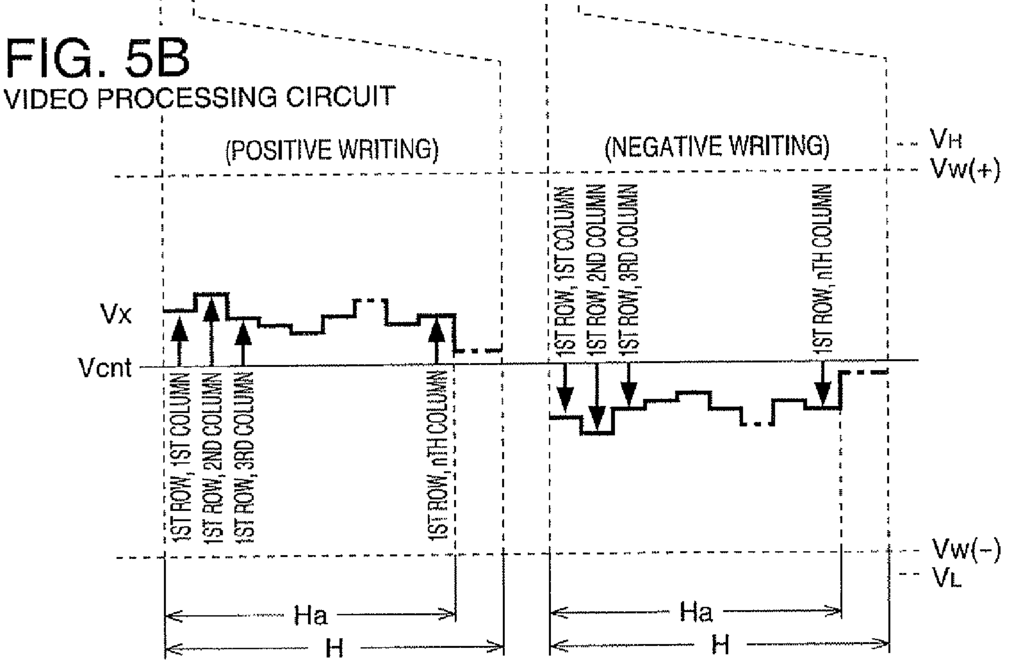

Since the lower left pixel is a black pixel whose liquid crystal molecules are unstable in the (n−1) frame, it takes time for the liquid crystal molecules to tilt according to the intensity of the vertical electric field. On the other hand, the lateral electric field from the next pixel electrodes 118 (Bk) is stronger than the vertical electric field induced by applying the voltage at white level to the pixel electrode 118 (Wt). Accordingly, in the pixel to be changed to white as shown in FIG. 5B, a liquid crystal molecule Rv on the side next to a black pixel is brought into a reverse tilt state earlier than the other liquid crystal molecules that attempt to tilt according to the vertical electric field.

Figure 8B:
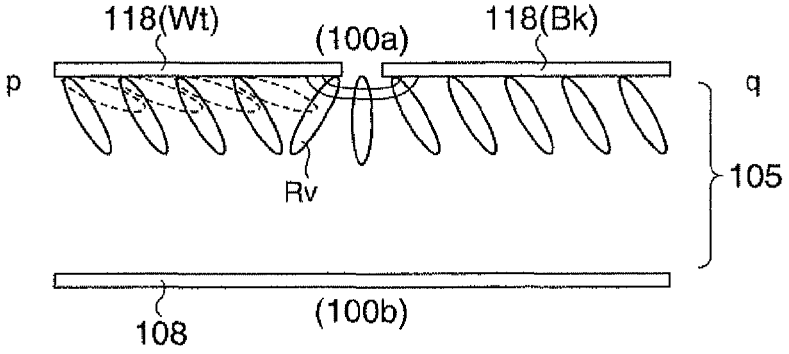
Figure 8C:
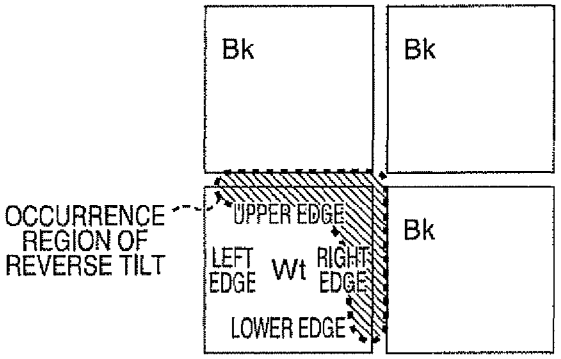

The liquid crystal molecule Rv that has been earlier brought into the reverse tilt state adversely affects the movement of the other liquid crystal molecules that attempt to tilt in the substrate horizontal direction according to the vertical electric field as shown by the broken lines. Therefore, as shown in FIG. 8C, a region where reverse tilt occurs in the pixel that should be changed to white does not stay within the gap between the pixel that should be changed to white and the black pixel, but expands from the gap over a wide range so as to erode the pixel that should be changed to white.

The pattern change shown in FIG. 8A occurs not only in the example shown in FIG. 7A, but also in a case where the pattern composed of black pixels moves in the right direction pixel by pixel every frame as shown in FIG. 7B, or in a case where the pattern moves in the upper direction pixel by pixel every frame as shown in FIG. 7C. Moreover, as in the description of FIG. 13A where viewed from another perspective, the pattern change also occurs in a case where the pattern composed of white pixels on the background of the region composed of black pixels moves in the upper right, right, or upper directions pixel by pixel every frame.

Figures 9A, 9B, 9C:
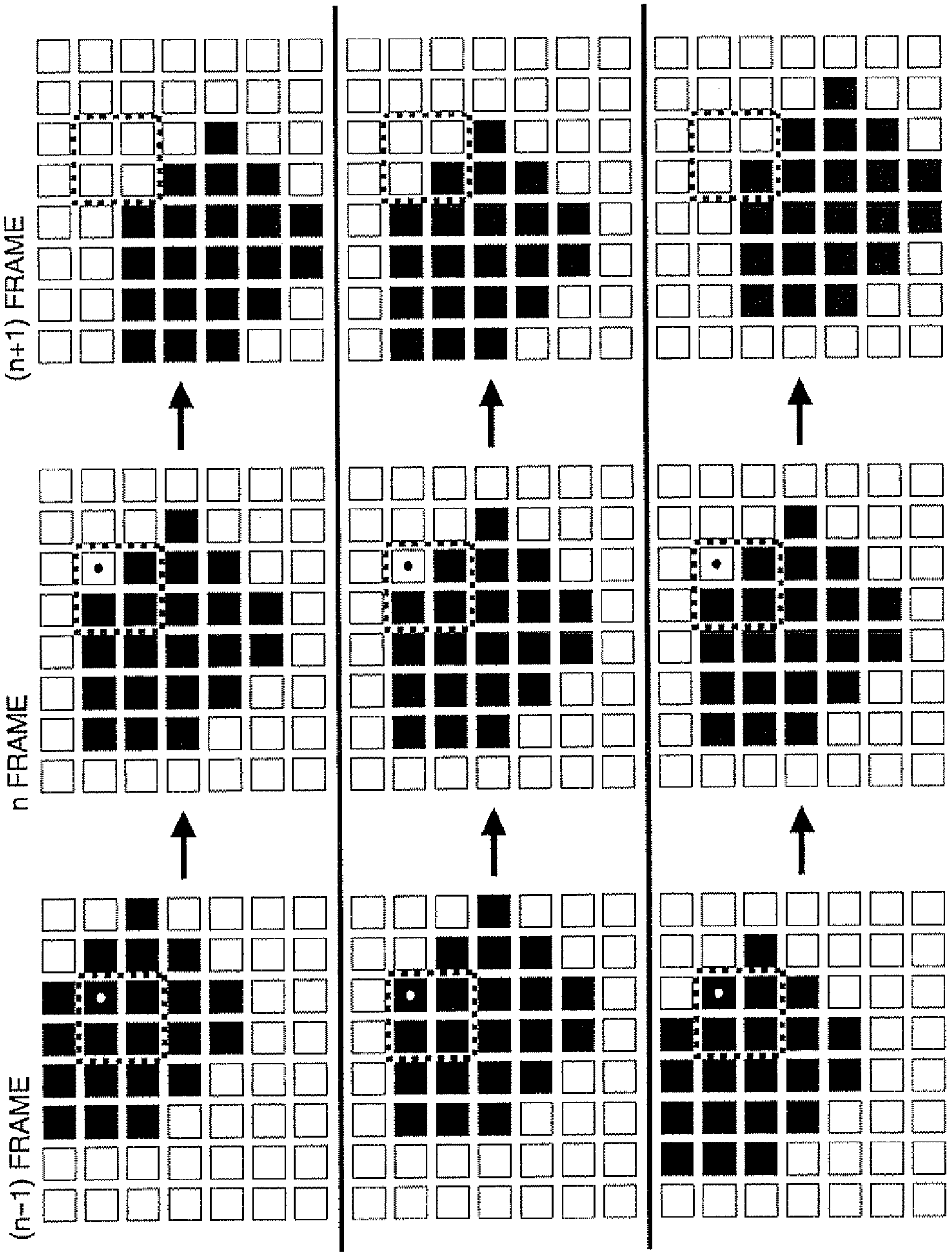
FIGS. 9A to 9C explain the movement of an image in the liquid crystal panel.

Next, in the liquid crystal panel 100 as shown in FIG. 9A, when a pattern composed of black pixels on a background of a region composed of white pixels moves in the lower left direction pixel by pixel every frame, 2×2=4 pixels surrounded by broken lines are focused. In this case as shown in FIG. 10A, in the state where all 2×2=4 pixels are black pixels in the (n−1) frame, only one pixel at the upper right corner is changed to a white pixel in the n frame.

Also after this change, the lateral electric field stronger than the vertical electric field in the gap between the pixel electrode 118 (Wt) and the common electrode 108 is generated in the gap between the pixel electrode 118 (Bk) of a black pixel and the pixel electrode 118 (Wt) of a white pixel. With this lateral electric field as shown in FIG. 10B, the liquid crystal molecule Rv in the black pixel and on the side next to the white pixel changes in alignment earlier than the other liquid crystal molecules that attempt to tilt according to the vertical electric field, and therefore is brought into the reverse tilt state. In the black pixel, however, the vertical electric field does not change from the (n−1) frame, and therefore, the liquid crystal molecule Rv has little influence on the other liquid crystal molecules. Therefore, in the pixel that is not changed from a black pixel, the region where the reverse tilt occurs is so narrow that it can be ignored as shown in FIG. 10C, compared to the example of FIG. 8C.

On the other hand, in the upper right pixel that is changed from black to white among 2×2=4 pixels, the initial alignment direction of liquid crystal molecules is a direction that is less likely to be affected by the lateral electric field. Therefore, even when the vertical electric field is applied, there are few liquid crystal molecules that are brought into the reverse tilt state. Therefore, in the upper right pixel, as the intensity of the vertical electric field increases, liquid crystal molecules tilt correctly in the horizontal direction of the substrate surface as shown by broken lines in FIG. 10B. As a result, since the upper right pixel is changed to an intended white pixel, display quality is less likely to be degraded.

Figure 10A:
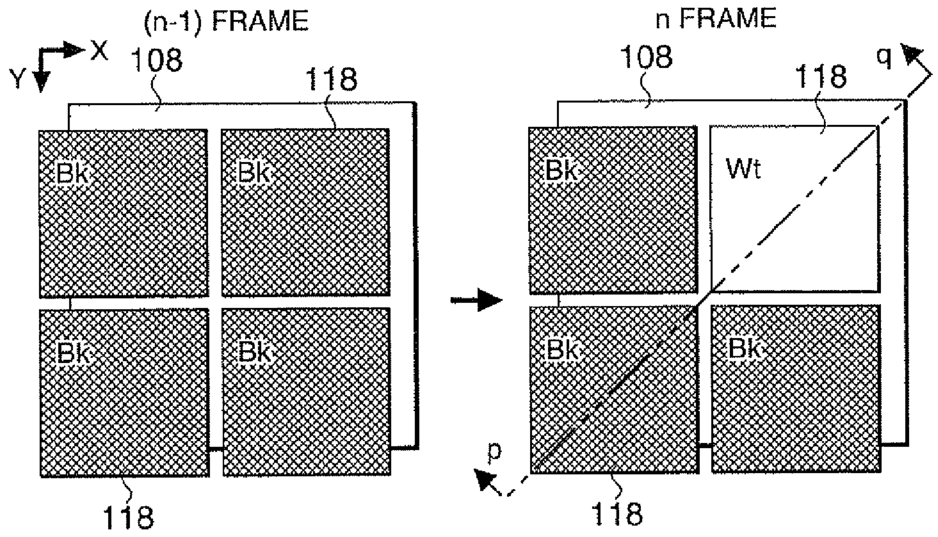
FIGS. 10A to 10C are explanatory views of reverse tilt that occurs in the liquid crystal panel.
Figure 10B:
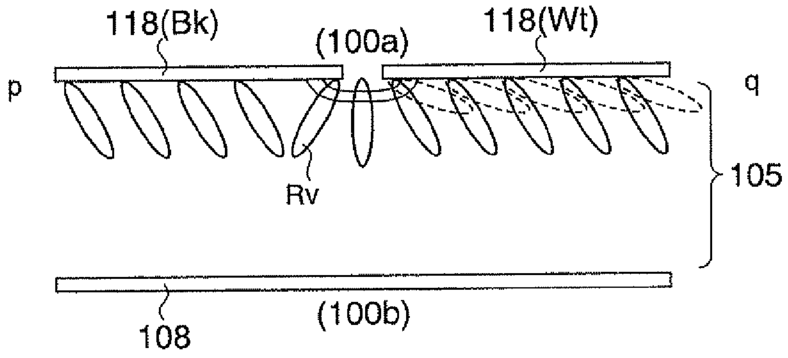
Figure 10C:
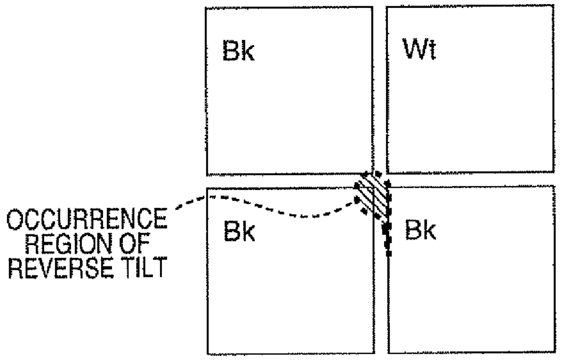

The pattern change shown in FIG. 10A occurs not only in the example shown in FIG. 9A, but also in a case where the pattern composed of black pixels moves in the left direction pixel by pixel every frame as shown in FIG. 9B, or in a case where the pattern moves in the lower direction pixel by pixel every frame as shown in FIG. 9C.

The situations in from FIGS. 6A to 10C will be summarized once. In a case where the tilt azimuthal angle θb is 45 degrees in the VA mode (normally black mode), when one n frame is focused, it can be said that the reverse tilt domain is likely to be generated in the n frame with all the following requirements satisfied. That is, in a case where:

(1) when an n frame is focused, a dark pixel and a bright pixel are next to each other, that is, a pixel whose applied voltage is low and a pixel whose applied voltage is high are next to each other to thereby increase a lateral electric field;

(2) in the n frame, the bright pixel (applied voltage is high) is positioned to the lower left or left of, or below the dark pixel (applied voltage is low), which corresponds to the upstream side of the tilt azimuth in a liquid crystal molecule; and (3) in a pixel to be changed to the bright pixel in the n frame, liquid crystal molecules are unstable in an (n−1) frame one frame before the n frame, reverse tilt is likely to occur in the bright pixel.

In other words, the condition under which a reverse tilt domain is generated in the bright pixel that satisfies the positional relationships of the requirements (1) and (2) in the n frame is the requirement (3) that the liquid crystal molecules are unstable in the (n−1) one frame before the n frame.

Here, the requirement (1) is substantially equal to detect boundaries at each of which a dark pixel and a bright pixel are next to each other in an image represented by the video signals Vid-in. The requirement (2) is equal to extract, from the detected boundaries, a portion thereof where the dark pixel is positioned above and the bright pixel is positioned below, and a portion thereof where the dark pixel is positioned to the right and the bright pixel is positioned to the left. Here, the portion extracted from the detected boundaries is referred to as "risk boundary" as will be described later.

FIGS. 7A to 7C illustrate the example in which 2×2=4 pixels are black pixels in the (n−1) frame and only the lower left pixel is changed to a white pixel in the next n frame. In general, however, similar movement is involved, not only in the (n−1) frame and the n frame, but also over a plurality of frames including before and after these frames. As shown in FIGS. 7A to 7C, therefore, in the dark pixel (pixel marked with a white dot) whose liquid crystal molecules are unstable in the (n−1) frame, it is considered based on the movement of the image pattern that a bright pixel is next to the lower left or left of, or below the dark pixel in many cases.

Therefore, in the (n−1) frame in advance, when a dark pixel and a bright pixel are next to each other in an image represented by the video signals Vid-in and the dark pixel is positioned to the upper right or right of, or above the bright pixel, if a voltage not causing liquid crystal molecules to become unstable is applied to a liquid crystal element corresponding to the dark pixel, it seems possible to suppress the occurrence of reverse tilt in the n frame because the requirement (3) is not satisfied even if the requirements (1) and (2) are satisfied in the n frame, due to the movement of the image pattern.

This will be re-expressed as follows using the risk boundary with a time base being turned back by one frame: in the n frame, in boundaries at each of which a dark pixel and a bright pixel are next to each other in an image represented by the video signals Vid-in, a portion of the boundaries where a dark pixel is positioned above and a bright pixel is positioned below and a portion thereof where a dark pixel is positioned to the right and a bright pixel is positioned to the left are each detected as the risk boundary; and a voltage not causing liquid crystal molecules to become unstable is applied to a liquid crystal element corresponding to a dark pixel adjacent to the risk boundary; whereby the requirement (3) is not satisfied even if the requirements (1) and (2) are satisfied in the next (n+1) frame. Therefore, it seems possible to prevent the occurrence of reverse tilt in the future (n+1) frame.

However, the application of the voltage not causing liquid crystal molecules to become unstable to the liquid crystal element corresponding to the dark pixel simply means, in short, the occurrence of a display artifact, in which an image not based on the video signal Vid-in is displayed. Accordingly, from a viewpoint that the number of pixels serving as display artifacts is minimized, the requirements (1) to (3) will be studied again.

Figure 11A:
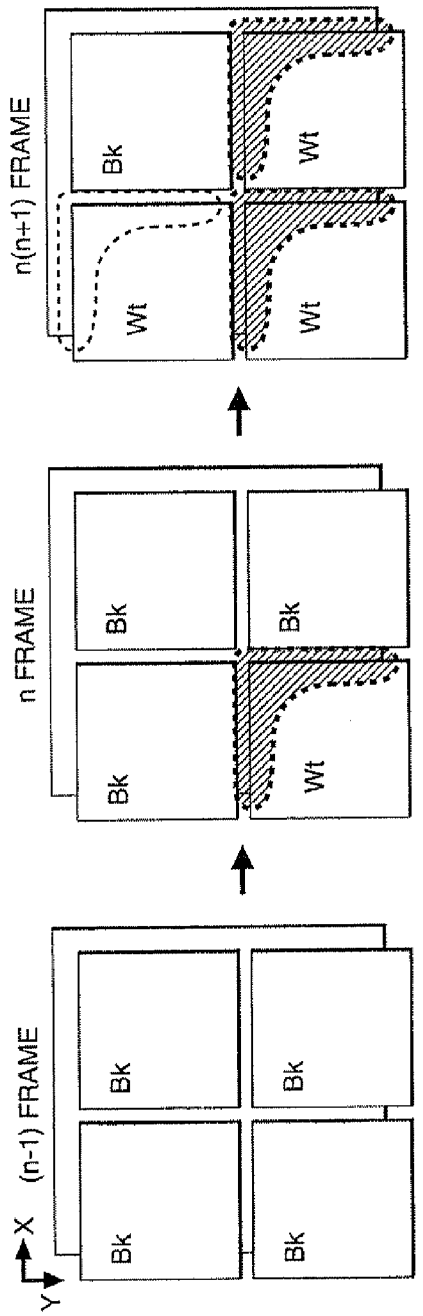
FIGS. 11A and 11B are explanatory views of reverse tilt that occurs in the liquid crystal panel.

As shown in FIG. 11A, in a case where all 2×2=4 pixels are, for example, black pixels (Bk) in the (n−1) frame, when only the lower left pixel is changed to a white pixel (Wt) in the n frame, reverse tilt occurs in the white pixel, as described with reference to FIGS. 8A to 8C. The reverse tilt in this case occurs, as shown in the n frame of FIG. 8C or 11A, on the upper-edge side and right-edge side in the white pixel. This is because, in the lower left white pixel, a strong lateral electric field is generated with each of a black pixel positioned above, a black pixel positioned to the upper right, and a black pixel positioned to the right.

In the next (n+1) frame, when the lower right pixel (a white pixel is next to the further right of the lower right pixel) is changed to a white pixel by the movement of a black pattern, reverse tilt occurs also the lower right pixel similarly on the upper-edge side and right-edge side and is coupled to the reverse tilt region that has already occurred on the upper-edge side of the lower left pixel. Thus, the occurrence regions of reverse tilt are contiguous over a plurality of pixels, and as a result, the regions are visually noticeable.

Figure 11B:
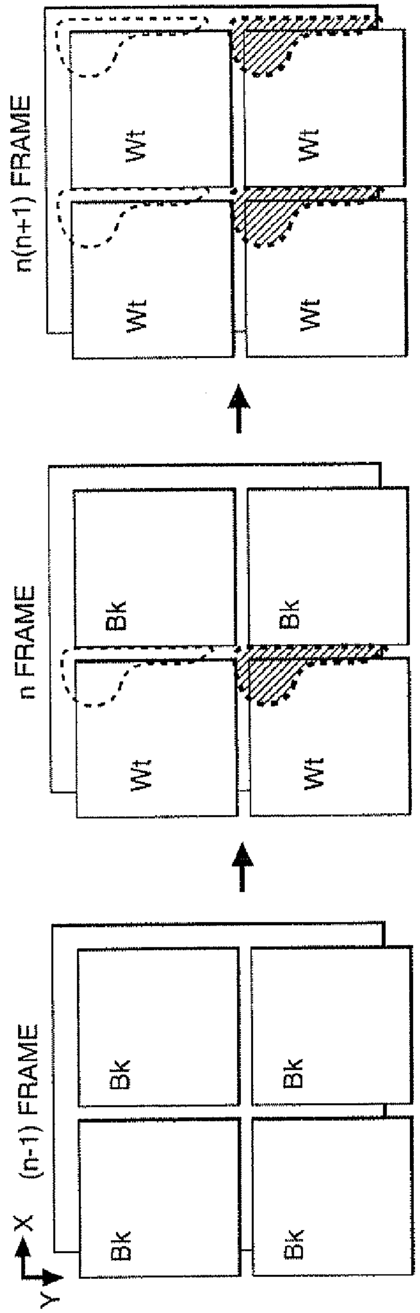

Next, as shown in FIG. 11B, a case where the lower left pixel and the upper left pixel among 2×2=4 pixels are changed to white pixels in the n frame, that is, a case where pixels in one column on the left are changed to white pixels will be considered. In this case, in the lower left pixel (attention pixel) that is changed to a white pixel in the n frame, reverse tilt occurs around the upper right corner and on the right-edge side as shown in the n frame of FIG. 11B, but is less likely to occur on the upper-edge side. This is because, in the attention pixel, a strong lateral electric field is generated with each of the black pixel positioned to the upper right and the black pixel positioned to the right, but almost no lateral electric field is generated with the bright pixel positioned above.

Moreover, the reason that, while reverse tilt occurs on the right-edge side in the attention pixel, a lateral electric field is not generated at the upper edge, resides in that the width of the occurrence region of reverse tilt in the horizontal direction is narrow compared to the example of FIG. 11A in which a lateral electric field is generated at two edges (upper and right edges).

Even when the lower right pixel and the upper right pixel among 2×2=4 pixels are changed to white pixels in the next (n+1) frame due to the movement of the black pattern in the right direction, reverse tilt extending in the horizontal direction (X-direction) does not exist on the upper-edge side. Therefore, the occurrence regions of reverse tilt are not coupled but scattered, so that the regions are not visually noticeable.

Here, although the case where the lower left pixel and the upper left pixel among 2×2=4 pixels are changed to bright pixels in the n frame has been considered, the same applies to a case where the lower left pixel and the lower right pixel are changed to bright pixels, that is, a case where pixels in one row on the bottom half are changed to white pixels.

In this manner, even when a white (bright) pixel that satisfies the positional relationships of the requirements (1) and (2) in the n frame satisfies the requirement (3), the influence of reverse tilt is not visually noticeable in some cases although the reverse tilt occurs. In view of this, the requirement (2) is revised to the following (2a):

(2a) in the n frame, the bright pixel (applied voltage is high) is surrounded by dark pixels (applied voltage is low) positioned above, and to the upper right and right of the bright pixel, that is, the bright pixel is surrounded by the risk boundaries on the upper-edge side and right-edge side.

Therefore, when this will be re-expressed using the risk boundary with a time base being turned back by one frame, while considering the requirements (1), (2a), and (3), the occurrence of reverse tilt can be suppressed as follows: in the n frame, in boundaries at each of which a dark pixel and a bright pixel are next to each other in an image represented by the video signals Vid-in, a portion of the boundaries where a dark pixel is positioned above and a bright pixel is positioned below and a portion thereof where a dark pixel is positioned to the right and a bright pixel is positioned to the left are each detected as the risk boundary; and, in the dark pixels adjacent to the risk boundaries, a voltage not causing liquid crystal molecules to become unstable is applied to a liquid crystal element of a dark pixel that is surrounded by the risk boundaries at two edges (left and lower edges); whereby the occurrence of reverse tilt can be prevented in the future (n+1) frame.

Next, in a case where, in the n frame, dark pixels and bright pixels are next to each other in an image represented by the video signals Vid-in, when a dark pixel is in the above-described positional relationship relative to bright pixels, how to prevent liquid crystal molecules from becoming unstable in the dark pixel will be studied. As described above, when liquid crystal molecules are unstable, an applied voltage to a liquid crystal element is below Vc. Therefore, for a dark pixel satisfying the positional relationship, when a voltage to be applied to a liquid crystal element and specified by the video signal Vid-in is below Vc, the voltage is forcibly replaced with the voltage Vc or more, and the replaced voltage is applied.

A study will now be made on a preferred value of a voltage for replacement. In the case where the applied voltage that is specified by the video signal Vid-in is below Vc, when the applied voltage is replaced with the voltage Vc or more and the replaced voltage is applied to a liquid crystal element, if priority is given where liquid crystal molecules are made more stable, or the generation of a reverse tilt domain is suppressed more reliably, a high voltage is preferable. In the normally black mode, however, as the applied voltage to a liquid crystal element increases, the transmittance increases. Since a gray-scale level specified by the original video signal Vid-in is of a dark pixel, that is, the transmittance is low, increasing the replacement voltage leads to display with a bright pixel that is not based on the video signal Vid-in.

On the other hand, if priority is given where, when the replaced voltage of Vc or more is applied to a liquid crystal element, a change in transmittance due to the replacement is hardly perceived, the voltage Vc as the lower limit is preferable.

In this manner, the value that should be employed as a replacement voltage should be determined depending on which priority is given. In the embodiment, priority is given where a change in transmittance due to the replacement is not perceived, so that the voltage Vc is employed as a replacement voltage. However, if priority is given to the above-described cases, a replacement voltage is not necessarily the voltage Vc.

The VA-mode liquid crystal molecules are most nearly perpendicular to the substrate surface when an applied voltage to a liquid crystal element is zero. The voltage Vc is a voltage to such an extent that gives an initial tilt angle to liquid crystal molecules, and liquid crystal molecules start to tilt upon application of the voltage.

The voltage Vc with which liquid crystal molecules become stable is not unconditionally determined because, in general, there are various parameters in a liquid crystal panel. However, in a liquid crystal panel in which the gap between the pixel electrodes 118 is narrower than the gap (cell gap) between the pixel electrode 118 and the common electrode 108 as in the embodiment, the voltage Vc is about 1.5 volts.

Accordingly, since a voltage of 1.5 volts is a lower limit as a replacement voltage, the replacement voltage may be this voltage or more. Conversely, when an applied voltage to a liquid crystal element is below 1.5 volts, liquid crystal molecules become unstable.

Based on the consideration described above, a circuit that processes the video signal Vid-in in the n frame for preventing the generation of a reverse tilt domain in the liquid crystal panel 100 is the video processing circuit 30 in FIG. 1. Next, the video processing circuit 30 will be described in detail.

Figure 3:
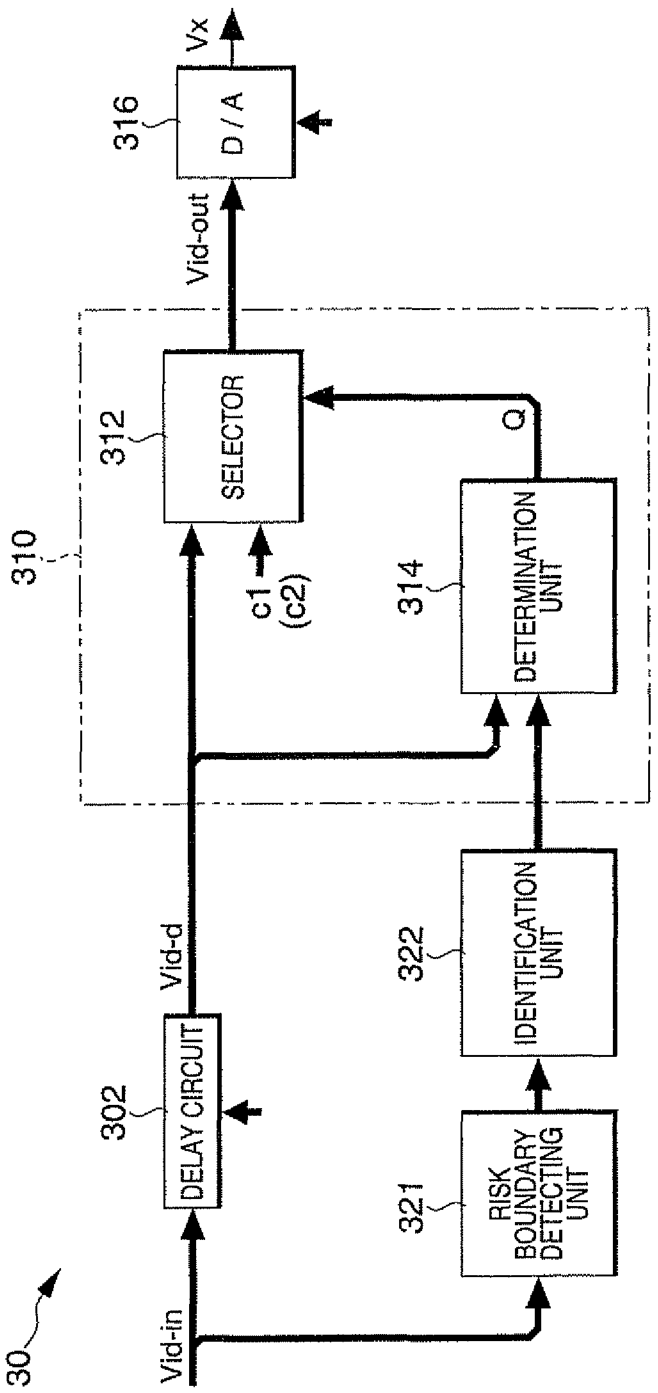
FIG. 3 shows the configuration of the video processing circuit.

FIG. 3 is a block diagram showing the configuration of the video processing circuit 30. As shown in the drawing, the video processing circuit 30 has a delay circuit 302, a replacement unit 310, a D/A converter 316, a risk boundary detecting unit 321, and an identification unit 322.

The delay circuit 302 is configured to accumulate the video signal Vid-in supplied from a higher-level device, read the video signal after the elapse of a predetermined time, and output the video signal as a video signal Vid-d, including a fast-in, fast-out (FIFO) memory and a multistage latch circuit. The accumulation and readout in the delay circuit 302 is controlled by the scanning control circuit 20.

The risk boundary detecting unit 321 analyzes an image represented by the video signals Vid-in and performs a first detection and a second detection. Specifically, the risk boundary detecting unit 321 executes the first detection to detect boundaries at each of which a pixel in the gray-scale range a and a pixel in the gray-scale range b are next to each other in the vertical or horizontal direction, and the second detection to detect as a risk boundary, in the detected boundaries, a portion thereof where a dark pixel is positioned above and a bright pixel is positioned below and a portion thereof where a dark pixel is positioned to the right and a bright pixel is positioned to the left.

The identification unit 322 identifies, in the dark pixels adjacent to the risk boundaries and output by the risk boundary detecting unit 321, a dark pixel that is surrounded by the risk boundaries at two edges, i.e., left and lower edges.

The replacement unit 310 has a selector 312 and a determination unit 314. The determination unit 314 determines whether or not a pixel represented by the video signal Vid-d that is output delayed is the dark pixel identified by the identification unit 322. If the determined result is "Yes", the determination unit 314 sets a flag Q of an output signal to "1", for example; while setting to "0", if the determined result is "No".

Since the risk boundary detecting unit 321 cannot detect the boundaries over the vertical or horizontal direction in an image to be displayed unless a plurality of rows of video signals have been accumulated, the delay circuit 302 is disposed for adjusting a supply timing of the video signal Vid-in from a higher-level device. Therefore, since a timing of the video signal Vid-in supplied from a higher-level device differs from a timing of the video signal Vid-d supplied from the delay circuit 302, their horizontal scanning periods and the like do not coincide with each other in a precise sense. However, the following description will be made without especially distinguishing between them.

The accumulation and the like of the video signal Vid-in in the risk boundary detecting unit 321 is controlled by the scanning control circuit 20.

The selector 312 is configured to replace, if a gray-scale level specified by the video signal Vid-d specifies a level darker than "c1" when the flag Q supplied from the determination unit 314 is "1", the gray-scale level with a video signal at the gray-scale level "c1" and output the video signal as a video signal Vid-out.

If a gray-scale level specified by the video signal Vid-d specifies a level equal to or brighter than "c1" even when the flag Q supplied from the determination unit 314 is "1", and if the flag Q is "0", the selector 312 does not replace the gray-scale level and outputs the video signal Vid-d as it is as the video signal Vid-out.

The D/A converter 316 converts the video signal Vid-out as digital data into the analog data signal Vx. In the embodiment as described above, since the frame inversion scheme is employed, the polarity of the data signal Vx is switched every rewriting for a unit of video image in the liquid crystal panel 100.

According to the video processing circuit 30, when a pixel represented by the video signal Vid-d is a dark pixel that is surrounded by the risk boundaries at two edges, the flag Q is "1", and when a gray-scale level specified to the dark pixel is a level darker than "c1", the gray-scale level of the dark pixel represented by the video signal Vid-d is replaced with "c1" and then output as the video signal Vid-out.

On the other hand, when a pixel represented by the video signal Vid-d is not a dark pixel that is adjacent to the risk boundary; when, even if the pixel is adjacent thereto, the pixel represented by the video signal Vid-d is a dark pixel that is adjacent to the risk boundary at only one edge; or when the gray-scale level specifies a level equal to or brighter than "c1", the flag Q is "0" in the embodiment. Therefore, the gray-scale level is not corrected, and the video signal Vid-d is output as the video signal Vid-out.

Display operation of the liquid crystal display device 1 will be described. From a higher-level device, the video signal Vid-in is supplied over a frame in the pixel order of from the first row, first column to the first row, nth column, from the second row, first column to the second row, nth column, from the third row, first column to the third row, nth column, . . . , and from the mth row, first column to the mth row, nth column. The video processing circuit 30 applies the replacement process and the like to the video signal Vid-in to output the video signal as the video signal Vid-out.

In view of a horizontal effective scanning period (Ha) in which the video signals Vid-out for the first row, first column to the first row, nth column are output, a processed video signal Vid is converted into, by the D/A converter 316 as shown in FIG. 5B, the positive or negative data signal Vx, for example, into the positive data signal in this case. The data signal Vx is sampled by the data line driving circuit 140 for the data lines 114 in the first to nth columns as the data signals X1 to Xn.

On the other hand, in a horizontal scanning period in which the video signals Vid-out for the first row, first column to the first row, nth column are output, the scanning control circuit 20 controls the scanning line driving circuit 130 so that only the scanning signal Y1 goes to H level. When the scanning signal Y1 is at H level, the TFTs 116 in the first row are turned on, and therefore, the data signal sampled for the data line 114 is applied to the pixel electrodes 118 through the TFTs 116 in the on state. Thus, a positive voltage according to a gray-scale level specified by the video signal Vid-out is written to each of liquid crystal elements in the first row, first column to the first row, nth column.

Consequently, the video signals Vid-in for the second row, first column to the second row, nth column are processed similarly by the video processing circuit 30 and output as the video signals Vid-out. In addition, the video signals Vid-in are converted into positive data signals by the D/A converter 316 and then sampled by the data line driving circuit 140 for the data lines 114 in the first to nth columns. In a horizontal scanning period (H) in which the video signals Vid-out for the second row, first column to the second row, nth column are output, since only the scanning signal Y2 goes to H level by the scanning line driving circuit 130, the data signal sampled for the data line 114 is applied to the pixel electrodes 118 through the TFTs 116 in the second row in the on state. Thus, a positive voltage according to a gray-scale level specified by the video signal Vid-out is written to each of liquid crystal elements in the second row, first column to the second row, nth column.

Thereafter, similar writing operation is executed on the third, fourth, . . . , and mth rows. Thus, a voltage according to a gray-scale level specified by the video signal Vid-out is written to each of liquid crystal elements, so that a transmission image defined in principle by the video signals Vid-in is produced.

In the next frame, similar writing operation is executed except that the video signal Vid-out is converted into a negative data signal due to the polarity inversion of data signal.

FIG. 5B is a voltage waveform diagram showing an example of the data signal Vx when the video signals Vid-out for the first row, first column to the first row, nth column are output over the horizontal scanning period (H) from the video processing circuit 30. Since the normally black mode is employed in the embodiment, the data signal Vx, if positive, becomes a voltage on the high-potential side (indicated by ↑ in the drawing), relative to the voltage Vcnt as the amplitude center, as a gray-scale level processed by the video processing circuit 30 increases (brightness increases); while the data signal Vx, if negative, becomes a voltage on the low-potential side (indicated by ↓ in the drawing), relative to the voltage Vcnt, by an amount corresponding to the gray-scale level.

Specifically, the voltage of the data signal Vx, if positive, becomes a voltage shifted from the voltage Vcnt by an amount corresponding to the gray-scale level in a range from the voltage Vcnt corresponding to black to a voltage Vw(+) corresponding to white; while if negative, the voltage of the data signal Vx becomes a voltage shifted from the voltage Vcnt by an amount corresponding to the gray-scale level in a range from the voltage Vont to a voltage Vw(−) corresponding to white. The voltages Vw(+) and Vw(−) are symmetrical about the voltage Vont.

It may be considered that the voltage LCcom to be applied to the common electrode 108 is substantially the same voltage as the voltage Vcnt. However, the voltage LCcom is sometimes adjusted so as to be lower than the voltage Vcnt in view of the off-leak of the re-channel TFT 116, the so-called push-down, and the like. A voltage corresponding to black in the normally black mode may be set to a voltage slightly on the higher potential side than the voltage Vont when positive; while when negative, the voltage may be set to a voltage slightly on the lower potential side than the voltage Vcnt.

FIG. 5B shows the voltage waveform of the data signal Vx, which differs from a voltage (the potential difference between the pixel electrode 118 and the common electrode 108) to be applied to the liquid crystal element 120. The vertical scale of the voltage of the data signal in FIG. 5B is enlarged compared to the voltage waveforms of the scanning signals and the like in FIG. 5A.

Consequently, a specific example of a process by the video processing circuit 30 according to the embodiment will be described.

Figure 12A:
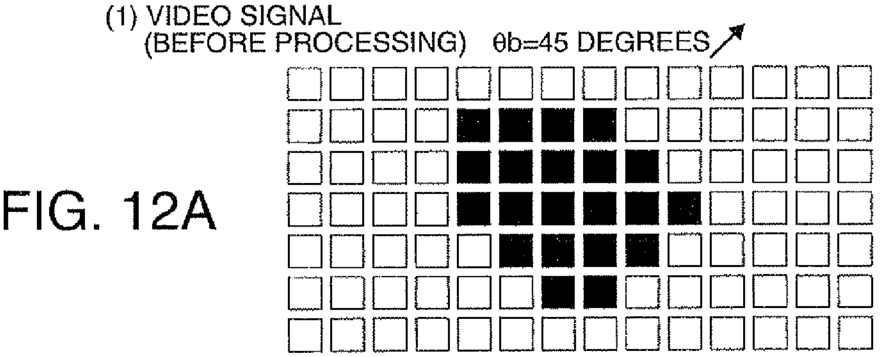
FIGS. 12A to 12D show a replacement process in the video processing circuit.
Figure 12B:
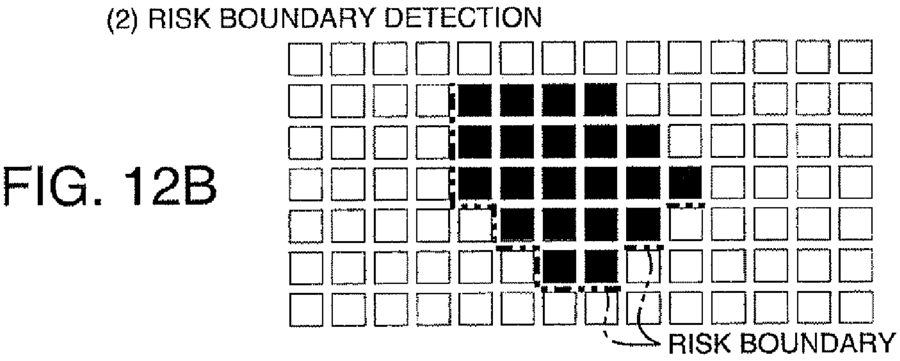

As shown in FIG. 12A for example, when an image (a portion thereof) represented by the video signals Vid-in is an image displaying a region composed of black (dark) pixels whose liquid crystal molecules are unstable on a background of white (bright) pixels in the gray-scale range b, risk boundaries detected by the risk boundary detecting unit 321 are as shown in FIG. 12B. That is, in boundaries (not shown) at each of which a dark pixel and a bright pixel are next to each other, a portion thereof where a dark pixel is positioned above and a bright pixel is positioned below, and a portion thereof where a dark pixel is positioned to the right and a bright pixel is positioned to the left are risk boundaries.

Figure 12C:
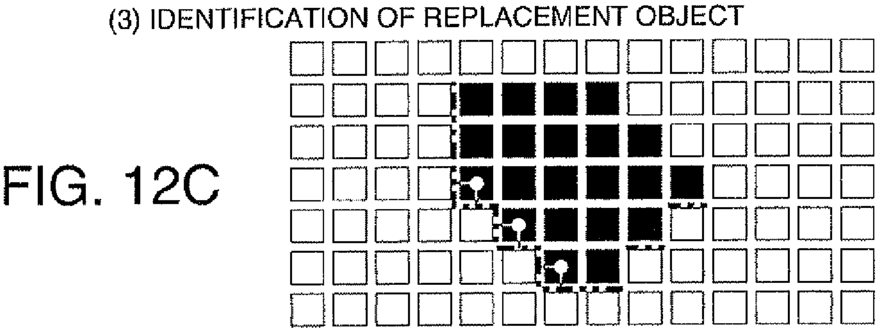

The identification unit 322 identifies, in the dark pixels adjacent to the risk boundaries, a dark pixel that is surrounded by the risk boundaries at two edges (left and lower edges). In the example of FIG. 12B, three pixels each marked with a white dot in FIG. 12C are each the dark pixel that is surrounded at two edges.

Figure 12D:
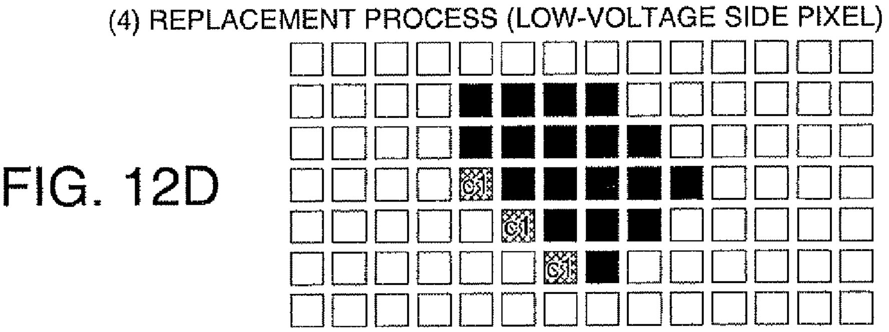

When all the dark pixels in this case are pixels darker than the gray-scale level "c1", the gray-scale level of the dark (black) pixel that is surrounded by the risk boundaries at two edges is replaced with the gray-scale level "c1" by the selector 312, so that the processed image is as shown in FIG. 12D.

Figure 13B:
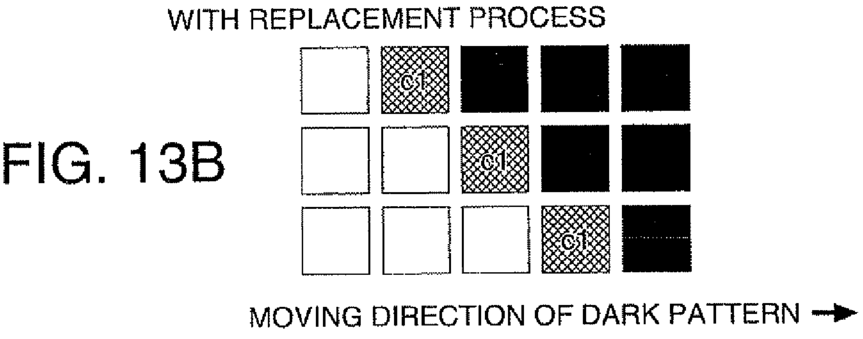

Therefore, in an image represented by the video signals Vid-in, as shown in FIG. 13A for example, even when a portion where a black pixel is changed to a white pixel is present because a black pattern composed of black pixels on a background of white pixels moves in the right direction by one pixel, the pixel whose liquid crystal molecules are unstable is not directly changed to a white pixel in the liquid crystal panel 100, as shown in FIG. 13B. However, the liquid crystal molecules are once forcibly brought into the stable state by the application of the voltage Vc corresponding to the gray-scale level "c1", and thereafter, the pixel is changed to a white pixel.

Although not especially shown in the drawing, the same applies to a case where the black pattern moves in the upper right direction or the upper direction.

Accordingly, since it is sufficient in the embodiment to perform not a process for the entire image corresponding to one frame but the process for detecting the risk boundary and the like. Therefore, compared to a configuration that analyzes images corresponding to two or more frames to detect movement, it is possible to suppress an increase in size and complexity of the video processing circuit. Further, it is possible to prevent a region where reverse tilt is likely to occur from becoming contiguous with the movement of a black pixel.

Moreover in the embodiment, in an image defined by the video signals Vid-in, a pixel whose gray-scale level is to be replaced is only a dark pixel that is surrounded by the risk boundaries at two edges and to which a gray-scale level darker than the gray-scale level "c1" is specified. Therefore, the number of portions where display not based on the video signal Vid-in occurs can be decreased in the embodiment, compared to a configuration that uniformly replaces dark pixels that are adjacent to a bright pixel and to which the gray-scale level darker than the gray-scale level "c1" is specified, or a configuration that uniformly replaces dark pixels that are adjacent to the risk boundaries.

Further in the embodiment, since video signals having a set value or more are not uniformly clipped, the contrast ratio is not adversely affected by providing an unused voltage range.

Since there is no need to make a change or the like to the structure of the liquid crystal panel 100, the aperture ratio is not lowered. Moreover, the embodiment can be applied to an existent liquid crystal panel that has been manufactured without devising its structure.

Examples of Other Tilt Azimuthal Angles

In the embodiment, a case has been described in which the tilt azimuthal angle θb is 45 degrees in the normally black mode in the VA mode. Next, examples in which the tilt azimuthal angle θb is other than 45 degrees will be described.

Tilt Azimuthal Angle: 0 Degree

Figure 14A:
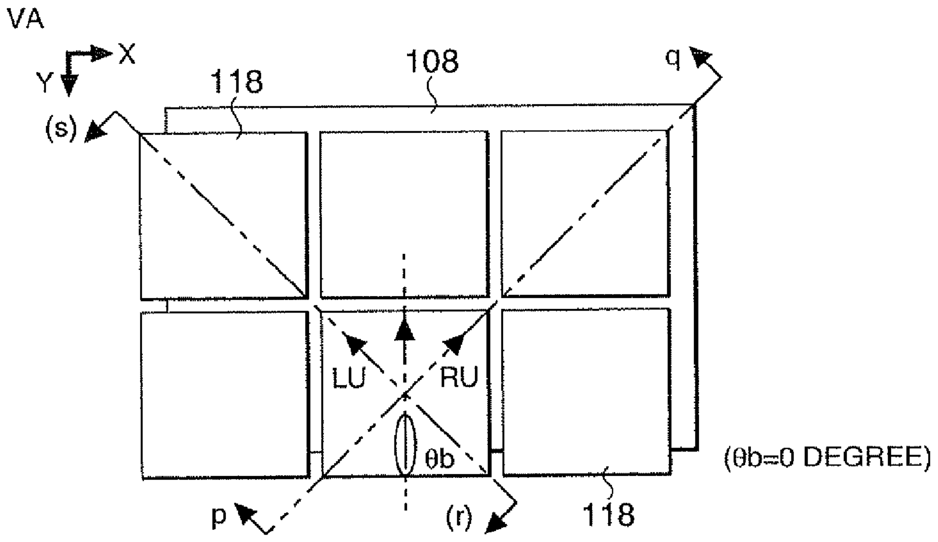
FIGS. 14A to 14C are explanatory views of initial alignment when a tilt azimuthal angle is 0 degree.
Figure 14B:
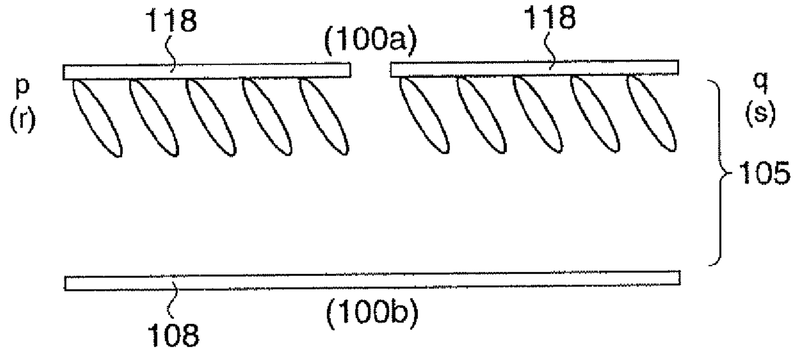
Figure 14C:
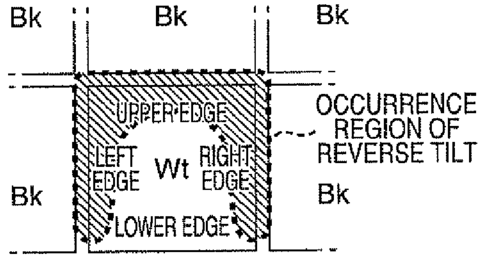

First as shown in FIG. 14A, a case where the tilt azimuthal angle θb is 0 degree will be described. In this case, when only an attention pixel is changed to a bright pixel (Wt) in a state where liquid crystal molecules of the attention pixel and all the pixels in the vicinity of the attention pixel are unstable, reverse tilt occurs in the attention pixel, as shown in FIG. 14C, on the upper-edge side, right-edge side, and left-edge side of the bright pixel.

Since the upper-edge side of the bright pixel is the downstream side of the tilt azimuth in a liquid crystal molecule, liquid crystal molecules on the side next to the upper black pixel are brought into the reverse tilt state, due to a lateral electric field generated with the upper dark pixel, earlier than the other liquid crystal molecules that attempt to tilt according to the vertical electric field.

At the upper right corner of the bright pixel, since the upper right black pixel is next thereto, a lateral electric field in the RU direction in FIG. 14A is generated. In the case where the tilt azimuthal angle θb is 0 degree, when the liquid crystal panel 100 is cut at a vertical plane including line p-q in FIG. 14A, a state of the liquid crystal molecules just before changing is similar to the case of FIG. 6A, as shown in FIG. 14B. Therefore, a reverse tilt domain is generated at the upper right corner of the bright pixel.

On the right-edge side of the bright pixel, since the right black pixel is next thereto, a lateral electric field in the horizontal direction (X-direction) in FIG. 14A is generated. The horizontal direction is perpendicular to a direction in which liquid crystal molecules attempt to tilt according to an applied voltage. Liquid crystal molecules that have been earlier brought into the reverse tilt state due to the lateral electric field adversely affect the movement of the other liquid crystal molecules that attempt to tilt according to the vertical electric field. Therefore, a reverse tilt domain is generated also on the right-edge side of the bright pixel.

At the upper left corner of the bright pixel, since the upper left black pixel is next thereto, a lateral electric field in the LU direction in FIG. 14A is generated. Therefore, when the liquid crystal panel 100 is cut at a vertical plane including line r-s in FIG. 14A, a state of liquid crystal molecules just before changing is similar to the case of FIG. 6A, as shown in FIG. 14B. Therefore, a reverse tilt domain is generated also at the upper left corner of the bright pixel similarly to the upper right corner.

On the left-edge side of the bright pixel, since the left black pixel is next thereto, a lateral electric field in the horizontal direction (X-direction) is generated. Therefore, a reverse tilt domain is generated also on the left-edge side of the bright pixel similarly to the right-edge side.

Since the lower-edge side of the bright pixel is the upstream side of the tilt azimuth in a liquid crystal molecule, liquid crystal molecules on the side next to the lower black pixel do not hinder the movement of the other liquid crystal molecules that attempt to tilt according to the vertical electric field. Therefore, almost no reverse tilt domain is generated on the lower-edge side of the bright pixel.

Therefore, considering that the tilt azimuthal angle θb is 0 degree in the normally black mode in the VA mode, it is conceivable that when a dark pixel is positioned above, or to the right or left of a bright pixel in the n frame, a reverse tilt domain may be generated in the bright pixel.

Next, a study will be made from a viewpoint of minimizing the number of pixels serving as display artifacts.

Figure 15:
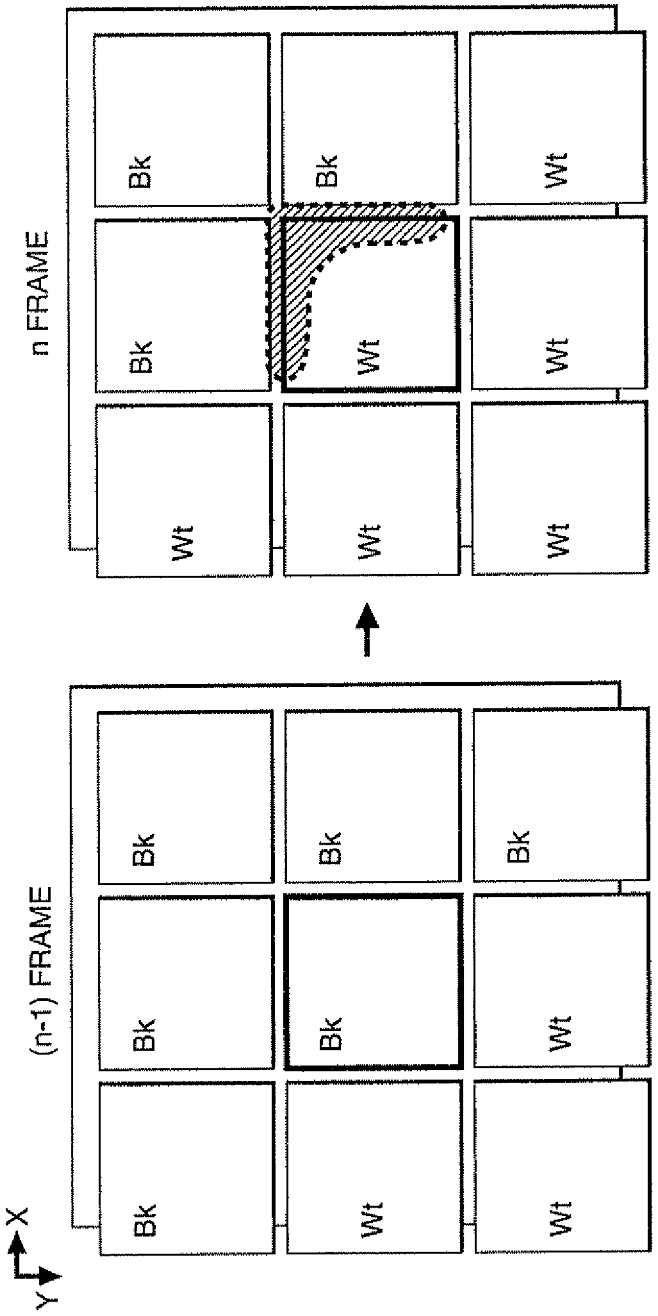
FIG. 15 is an explanatory view of reverse tilt that occurs when a tilt azimuthal angle is 0 degree.

First, as shown in FIG. 15, it is assumed that 3×3=9 pixels change by the movement of a black pattern, and attention is focused on a pixel at the center. This example shows a case where the attention pixel is changed from a state where its liquid crystal molecules are unstable in the (n−1) frame to a bright pixel (Wt) in the n frame, and dark pixels (Bk) are next above, and to the upper right and right of the bright pixel. In this case, in the attention pixel in the n frame, a reverse tilt domain is generated on the upper-edge side and right-edge side due to a lateral electric field. However, since a bright pixel is positioned to the left, and a lateral electric field is not generated, a reverse tilt domain is not generated on the left-edge side.

In the example of FIG. 15, therefore, when the black pattern in the n frame moves in the upper direction by one pixel in the next frame, the reverse tilt domain couples to an occurrence region of reverse tilt extending in the vertical direction on the right-edge side; and when the black pattern moves in the right direction by one pixel in the next frame, the reverse tilt domain couples to an occurrence region of reverse tilt extending in the horizontal direction on the upper-edge side. Thus, the occurrence regions of reverse tilt are contiguous over a plurality of pixels, and as a result, the regions are visually noticeable.

Here, the occurrence situation of reverse tilt in the attention pixel in the example of FIG. 15 is similar to the example of FIG. 11A in which the tilt azimuthal angle θb is 45 degrees. Therefore, when a bright pixel is positioned above the attention pixel, a reverse tilt domain is not generated on the upper-edge side of the attention pixel. Similarly, when a bright pixel is positioned to the right of the attention pixel, a reverse tilt domain is not generated on the right-edge side of the attention pixel.

Accordingly, also in the case where the tilt azimuthal angle θb is 0 degree, when a pixel is changed from the state where its liquid crystal molecules are unstable to the bright pixel (Wt), if the pixel is not surrounded at two edges (upper and right edges) where a lateral electric field is generated, but surrounded at one of the edges, it is considered that the occurrence regions of reverse tilt are not coupled together but scattered, and that the regions are not visually noticeable.

Figure 16:
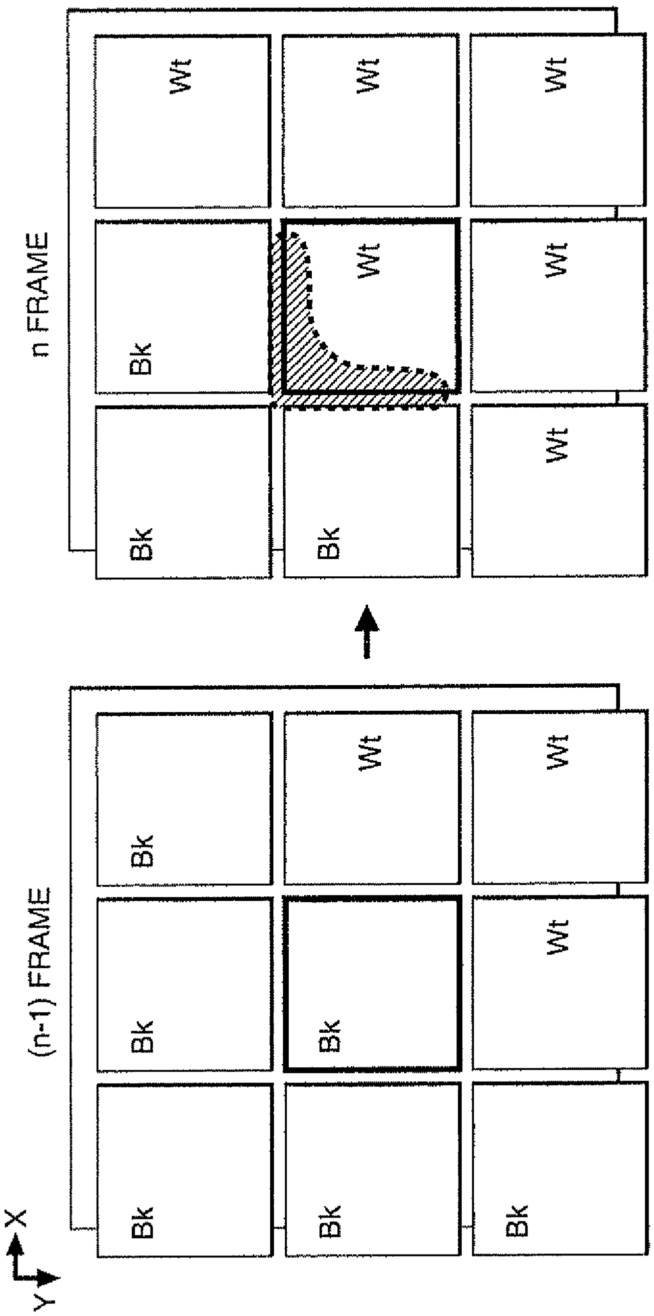
FIG. 16 is an explanatory view of reverse tilt that occurs when a tilt azimuthal angle is 0 degree.
Figure 17A:
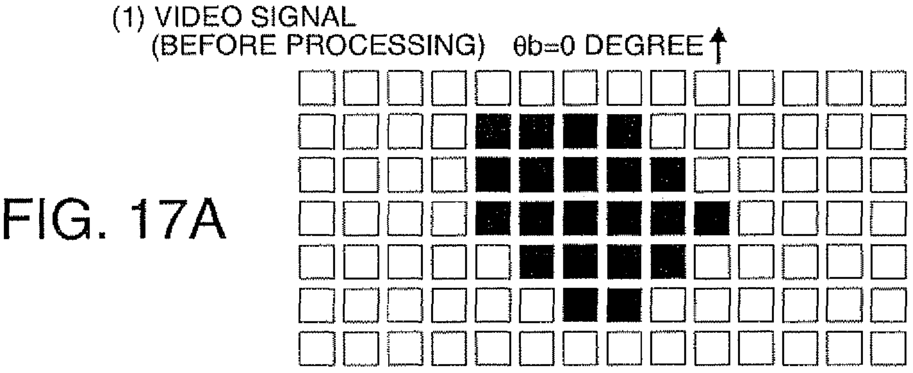
FIGS. 17A to 17D show a replacement process when a tilt azimuthal angle is 0 degree.
Figure 17B:
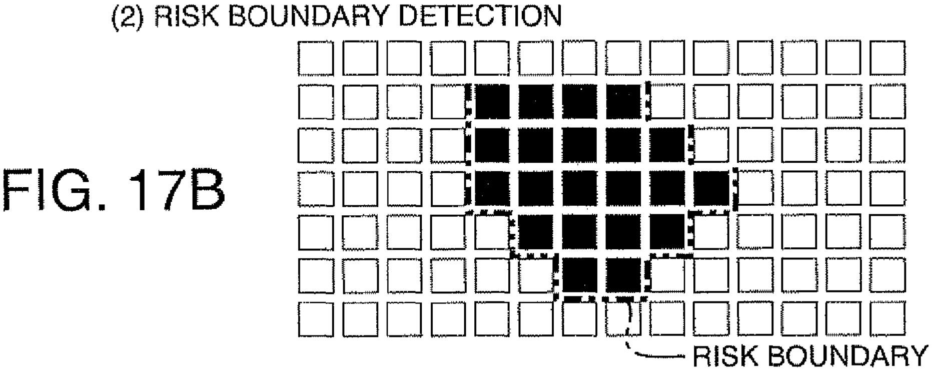
Figure 17C:
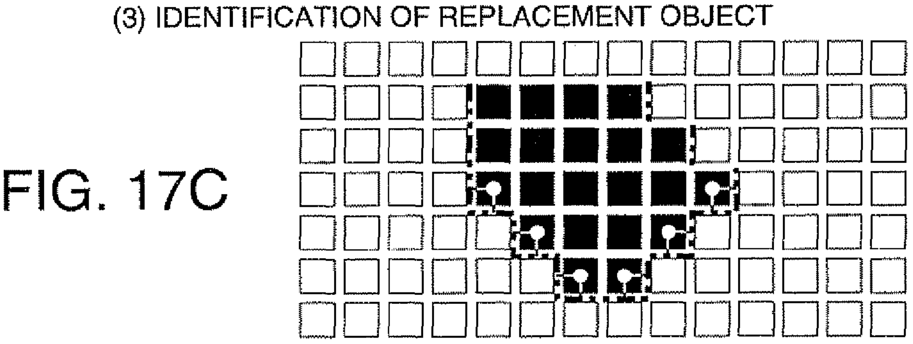
Figure 17D:
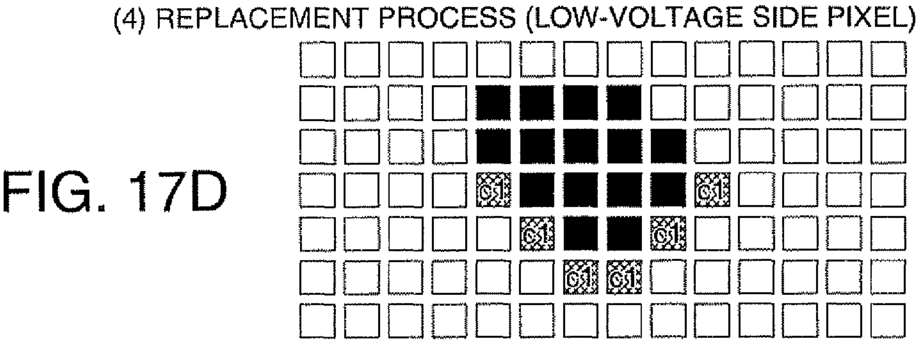

As shown in FIG. 16, it is assumed that 3×3=9 pixels are changed by the movement of a black pattern. In this case, an attention pixel at the center is changed from the state where its liquid crystal molecules are unstable in the (n−1) frame to a bright pixel (Wt) in the n frame, and dark pixels (Bk) are next above, and to the upper left and left of the bright pixel. Therefore, in the attention pixel in the n frame, a reverse tilt domain is generated on the upper-edge side and left-edge side by a lateral electric field, but not generated on the right-edge side. In the example of FIG. 16, therefore, when the black pattern in the n frame moves in the upper direction by one pixel in the next frame, the reverse tilt domain couples to an occurrence region of reverse tilt extending in the vertical direction on the left-edge side; and when the black pattern moves in the left direction by one pixel in the next frame, the reverse tilt domain couples to an occurrence region of reverse tilt extending in the horizontal direction on the upper-edge side. Thus, the occurrence regions of reverse tilt are contiguous over a plurality of pixels, and as a result, the regions are visually noticeable.

Similarly, also in the example of FIG. 16, when the attention pixel is changed from the state where its liquid crystal molecules are unstable to the bright pixel (Wt), if the pixel is not surrounded at two edges (upper and left edges) where a lateral electric field is generated, but surrounded at one of the edges, it is considered that the occurrence regions of reverse tilt are not coupled together but scattered, and that the regions are not visually noticeable.

Accordingly, when the tilt azimuthal angle θb is 0 degree, the following process is performed. That is, in the n frame, in boundaries each at which a dark pixel and a bright pixel are next to each other in an image represented by the video signals Vid-in, a portion thereof where a dark pixel is positioned above and a bright pixel is positioned below, a portion thereof where a dark pixel is positioned to the right and a bright pixel is positioned to the left, and a portion thereof where a dark pixel is positioned to the left and a bright pixel is positioned to the right are each detected as a risk boundary; and, in the dark pixels adjacent to the risk boundaries, a voltage not causing liquid crystal molecules to become unstable is applied to a liquid crystal element of a dark pixel that is surrounded by the risk boundaries at least two edges (left and lower edges, or right and lower edges). With this process, the occurrence of reverse tilt can be prevented in the future (n+1) frame.

To this end, the embodiment is configured as follows; the risk boundary detecting unit 321 also detects in the second detection as a risk boundary, in the boundaries detected in the first detection, a portion thereof where a dark pixel is positioned to the left and a bright pixel is positioned to the right, in addition to the portion thereof where a dark pixel is positioned above and a bright pixel is positioned below and the portion thereof where a dark pixel is positioned to the right and a bright pixel is positioned to the left; and further, the identification unit 322 identifies, in the dark pixels adjacent to the risk boundaries, a dark pixel that is surrounded by the risk boundaries at least two edges.

FIGS. 17A to 17D show a specific example of a process by the video processing circuit 30 when the tilt azimuthal angle θb is 0 degree in the normally black mode in the VA mode. The example of FIGS. 17A to 17D differs from the example of FIGS. 12A to 12D in that also the portion where a dark pixel is positioned to the left and a bright pixel is positioned to the right is detected as a risk boundary, and that also a dark pixel that is surrounded by the risk boundaries at the lower and right edges is a replacement object for the gray-scale level.

Although omitted in the example of FIGS. 17A to 17D, also a dark pixel that is surrounded by the risk boundaries at three edges, i.e., lower, left, and right edges, is a replacement object for the gray-scale level.

In the case where the tilt azimuthal angle θb is 0 degree, even when a portion where a black pixel is changed to a white pixel is present because a black pattern composed of black pixels moves by one pixel in any direction except for the downward direction in an image defined by the video signals Vid-in, the black pixel is not directly changed from the state where its liquid crystal molecules are unstable to a white pixel in the liquid crystal panel 100. However, the liquid crystal molecules are once forcibly brought into the stable state by the application of the voltage Vc corresponding to the gray-scale level “c1”, and thereafter, the black pixel is changed to a white pixel. Therefore, the generation of a reverse tilt domain can be suppressed.

Here, even when the black pattern moves in the downward direction by one pixel, a reverse tilt domain is less likely to be generated, as described above.

Tilt Azimuthal Angle: 225 Degrees

Figure 18A:
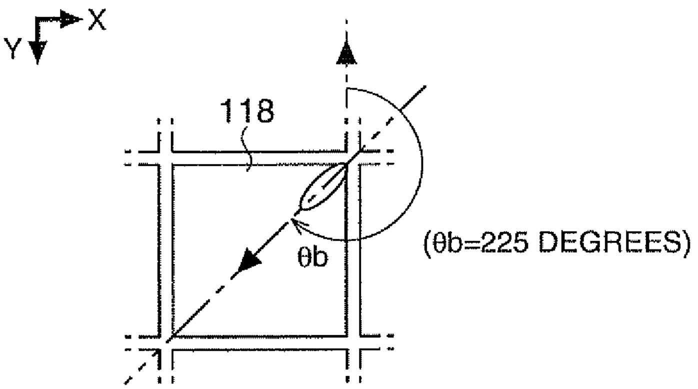
FIGS. 18A and 18B are explanatory views of initial alignment when a tilt azimuthal angle is 225 degrees.
Figure 18B:
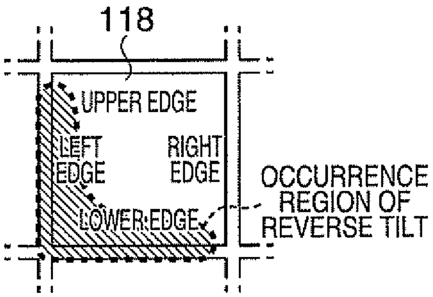
Figure 19A:
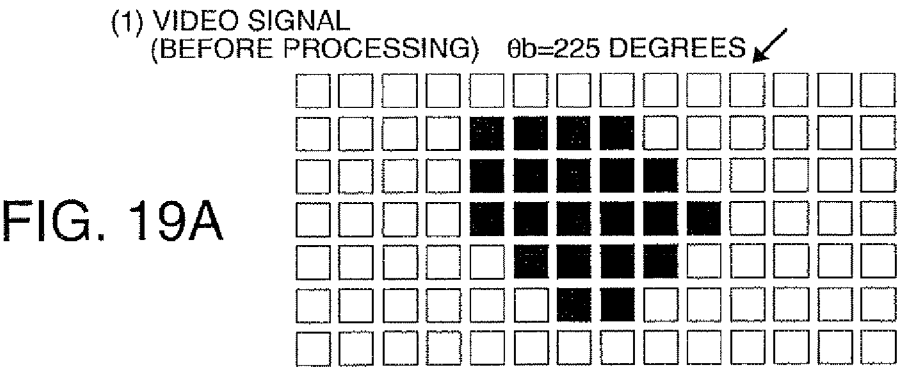
FIGS. 19A to 19D show a replacement process when a tilt azimuthal angle is 225 degrees.
Figure 19B:
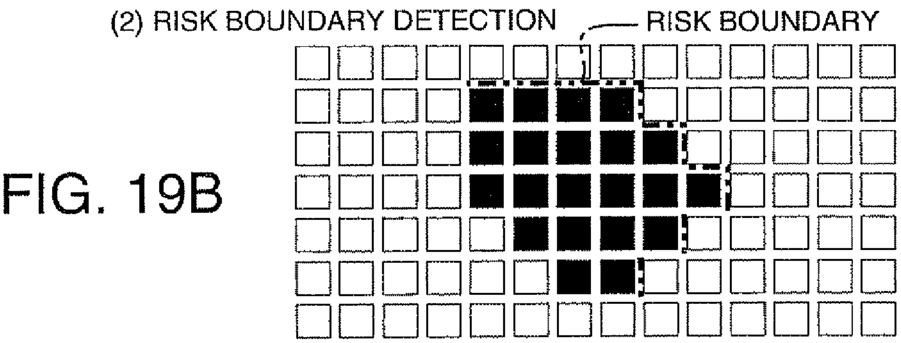
Figure 19C:
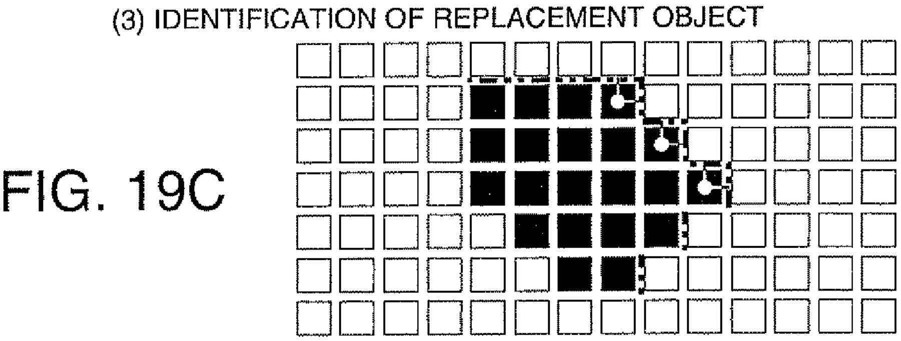
Figure 19D:
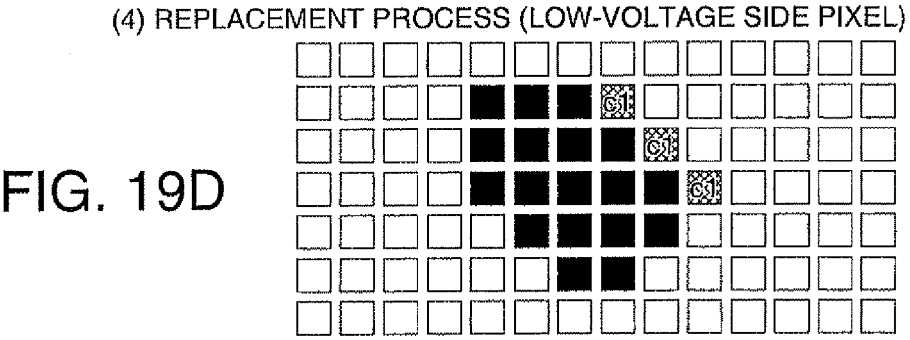
Figure 20A:
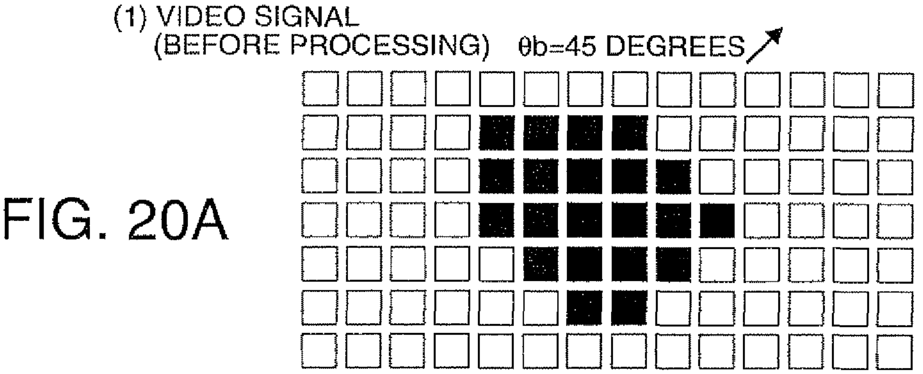
FIGS. 20A to 20D show another replacement process (1) in the video processing circuit.
Figure 20B:
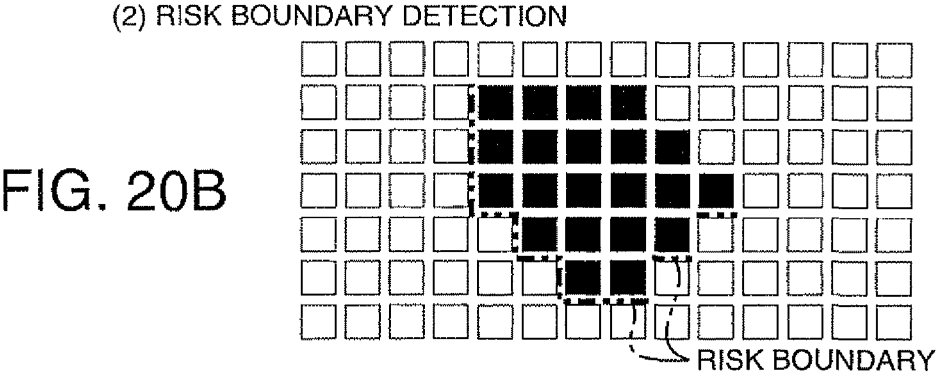
Figure 20C:
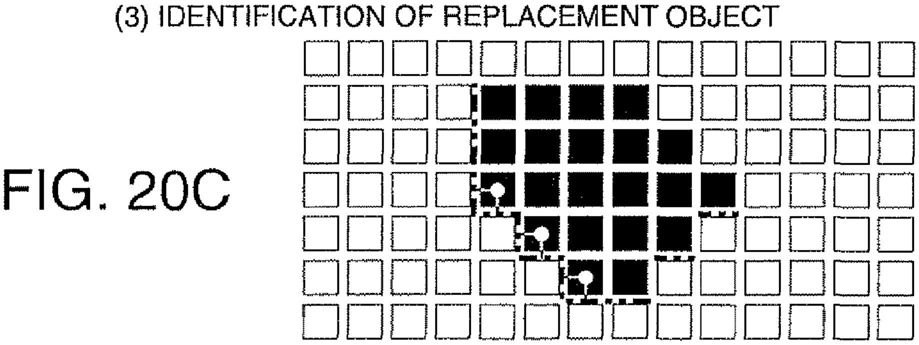
Figure 20D:
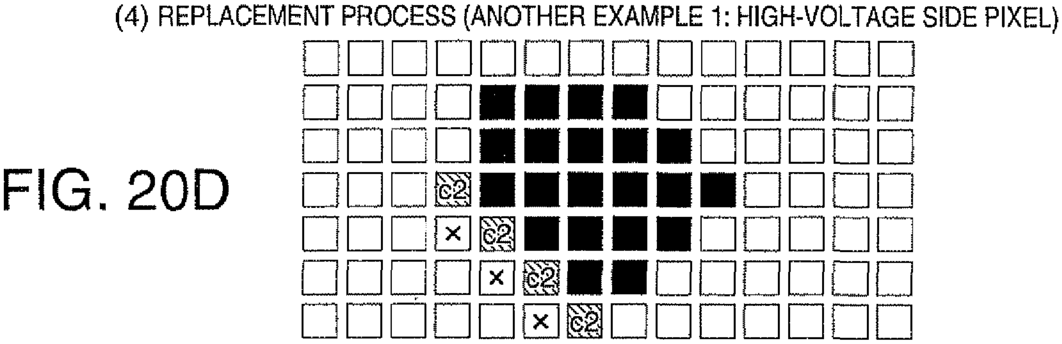
Figure 21A:
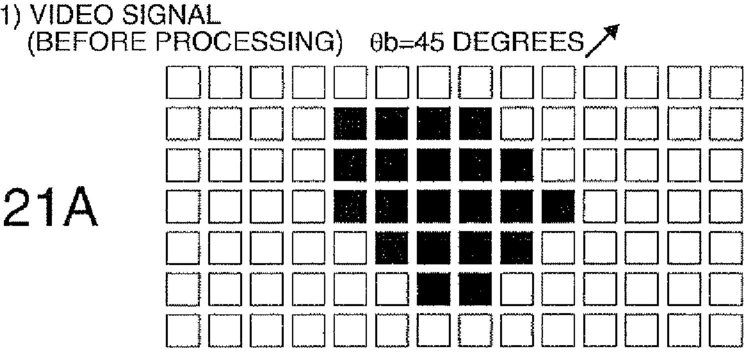
FIGS. 21A to 21D show still another replacement process (2) in the video processing circuit.
Figure 21B:
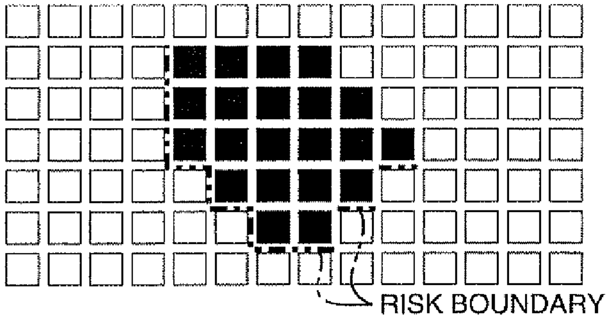
Figure 21C:
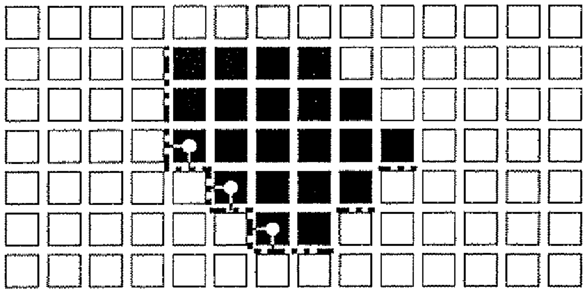
Figure 21D:
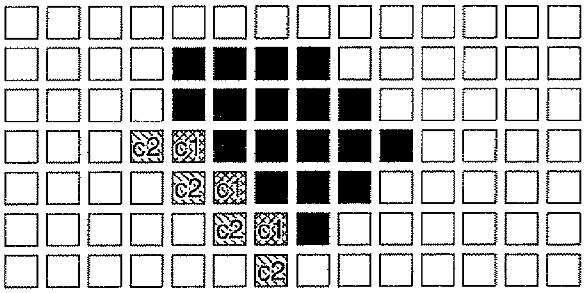

Next, as shown in FIG. 18A, a case where the tilt azimuthal angle θb is 225 degrees will be described. This example is equivalent to a case where the example of FIGS. 8A to 8C in which the tilt azimuthal angle θb is 45 degrees is rotated by 180 degrees. Therefore, the position of the occurrence region of reverse tilt is reversed about the center of a pixel as shown in FIG. 18B.

Therefore, when the tilt azimuthal angle θb is 225 degrees, the following process is performed. That is, in the n frame, in boundaries at each of which a dark pixel and a bright pixel are next to each other in an image represented by the video signals Vid-in, a portion thereof where a dark pixel is positioned below and a bright pixel is positioned above and a portion thereof where a dark pixel is positioned to the left and a bright pixel is positioned to the right are each detected as a risk boundary; and, in the dark pixels adjacent to the risk boundaries, a voltage not causing liquid crystal molecules to become unstable is applied to a liquid crystal element of a dark pixel that is surrounded by the risk boundaries at two edges (upper and right edges). With this process, the occurrence of reverse tilt can be prevented in the future (n+1) frame.

To this end, the embodiment is configured as follows: the risk boundary detecting unit 321 detects in the second detection as a risk boundary, in the boundaries detected in the first detection, a portion thereof where a dark pixel is positioned below and a bright pixel is positioned above and a portion thereof where a dark pixel is positioned to the left and a bright pixel is positioned to the right; and the identification unit 322 identifies, in the dark pixels adjacent to the risk boundaries, a dark pixel that is surrounded by the risk boundaries at the two edges described above.

FIGS. 19A to 19D show a specific example of a process by the video processing circuit 30 when the tilt azimuthal angle θb is 225 degrees in the normally black mode in the VA mode. The example of FIGS. 19A to 19D differs from the example of FIGS. 12A to 12D in risk boundary, and in that a dark pixel that is surrounded by risk boundaries at upper and right edges is a replacement object for the gray-scale level. Advantageous effects are the same as those of the embodiment.

Pixel as Replacement Object

In the embodiment, when a gray scale darker than the gray-scale level “c1” is specified to a dark pixel as a replacement object, the gray scale is replaced with the gray-scale level “c1”. This is because, in the normally black mode, the unstable state of liquid crystal molecules due to a low applied voltage to a liquid crystal element is caused in a dark pixel.

On the other hand, for suppressing the generation of a reverse tilt domain, only decreasing a lateral electric field caused by a dark pixel and a bright pixel with a risk boundary interposed therebetween is sometimes effective.

For decreasing the lateral electric field caused by a dark pixel and a bright pixel, other than the embodiment, a process for correcting a bright pixel to be darker, and a process for correcting a dark pixel and correcting a bright pixel to be darker are conceivable in the normally black mode.

The respective processes will be described in which the tilt azimuthal angle θb is 45 degrees in the normally black mode in the VA mode.

1: Correction on High-Voltage Side Pixel

First, a case will be described in which, between the dark pixel and the bright pixel with the risk boundary interposed therebetween, the bright pixel, that is, a pixel whose liquid crystal element is applied with a higher voltage (high-voltage side pixel) is corrected.

In this case, the determination unit 314 determines whether or not a pixel represented by the video signal Vid-d is a bright pixel that is positioned to the left of or below the dark pixel identified by the identification unit 322. If the determined result is “Yes”, the flag Q is set to “1”; while if the determined result is “No”, the flag Q is set to “0”. In this determination, also in a case where the pixel represented by the video signal Vid-d is a bright pixel that is positioned to the lower left of the dark pixel identified by the identification unit 322, the flag Q may be set to “1”. Alternatively, a case where a gray-scale level of the dark pixel identified by the identification unit 322 is darker than “c1” may be added to the requirement for the determination.

Further, the selector 312 may be configured such that when the flag Q is "1", a gray-scale level specified by the video signal Vid-d is replaced with a video signal having a level of "C2" that is darkened by a predetermined level.

FIGS. 20A to 20D show a specific example in which a gray-scale level of a high-voltage side pixel adjacent to the risk boundary is replaced. The example of FIGS. 20A to 20D differs from the example of FIGS. 12A to 12D in that a pixel as a replacement object is a bright pixel that is surrounded by the risk boundaries at lower and left edges, and that a gray-scale level of the bright pixel is replaced with the darker gray-scale level "C2". Also with such a process, since a lateral electric field to be generated is changed to be decreased, the generation of a reverse tilt domain can be suppressed.

In the example of FIGS. 20A to 20D, also a gray-scale level of a bright pixel (marked with x) that is positioned to the lower left of the dark pixel that is surrounded by the risk boundaries at two edges may be replaced with the gray-scale level "C2".

2: Correction on Both Dark Pixel and High-Voltage Side Pixel

Consequently, a case will be described in which a dark pixel at a level darker than the gray-scale level "c1" is corrected and a bright pixel is corrected to be darker. In this process, the example described above and the high-voltage side correction are combined. Therefore, a specific example of the process has the contents of FIGS. 12D and 20D combined together as shown in FIGS. 21A to 21D.

Also with such a process, since a lateral electric field to be generated is changed to be decreased, the generation of a reverse tilt domain can be suppressed.

Especially in the example, since gray-scale levels for both a dark pixel and a bright pixel are corrected, the boundary between the dark pixel and bright pixel represented by the original video signal Vid-in is visible as it is as the outline of the corrected image. Therefore, it is possible in the example to prevent contour information of the image represented by the original video signals Vid-in from being lost due to the correction.

TN Mode

In the embodiment, the example of using the VA-mode liquid crystal 105 has been described. Next, an example of using TN-mode liquid crystal 105 will be described.

Figure 22A:
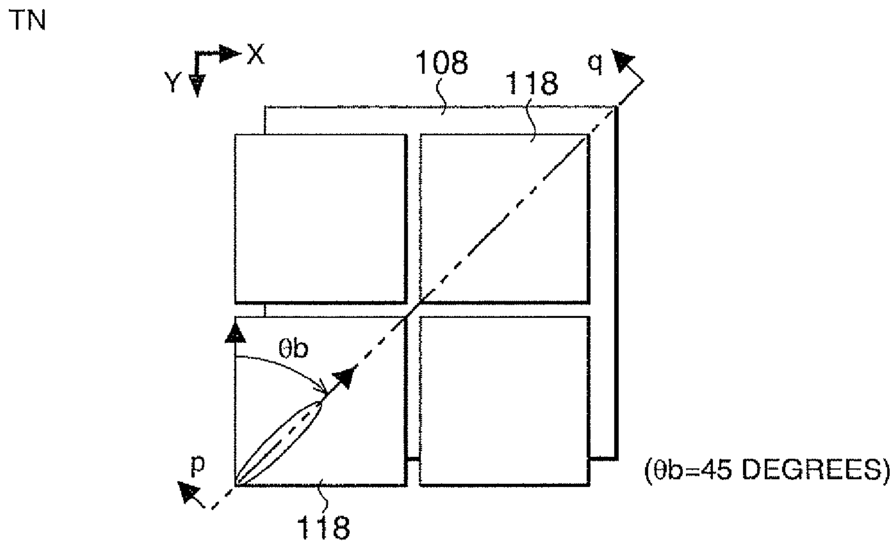
FIGS. 22A and 22B are explanatory views of initial alignment in the liquid crystal panel in the TN mode.
Figure 22B:
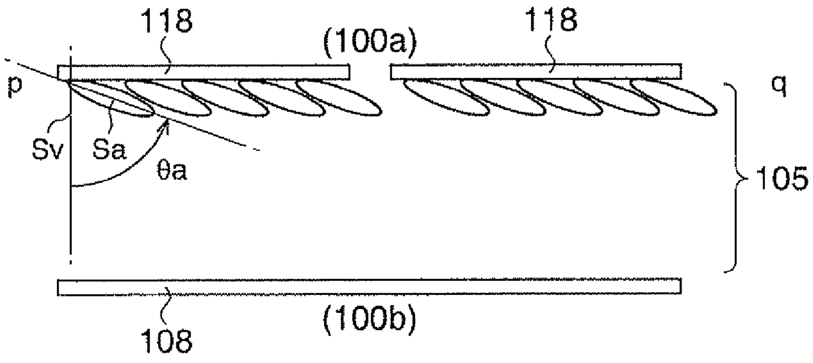

FIG. 22A shows 2×2 pixels in the liquid crystal panel 100. FIG. 22B is a simplified cross-sectional view cut at a vertical plane including line p-q of FIG. 22A.

As shown in the drawings, it is assumed that, in a state where the potential difference between the pixel electrode 118 and the common electrode 108 is zero, TN-mode liquid crystal molecules are initially aligned at the tilt angle of θa and the tilt azimuthal angle of θb (=45 degrees). In the TNN mode, contrary to the VA mode, the liquid crystal molecules tilt in the substrate horizontal direction, and therefore, the tilt angle θa in the TN mode is greater than that of the VA mode.

When the TN-mode liquid crystal 105 is used, the normally white mode where the liquid crystal element 120 is in a white state with no application of voltage is employed in many cases because a high contrast ratio and the like are obtained.

Figure 4B:
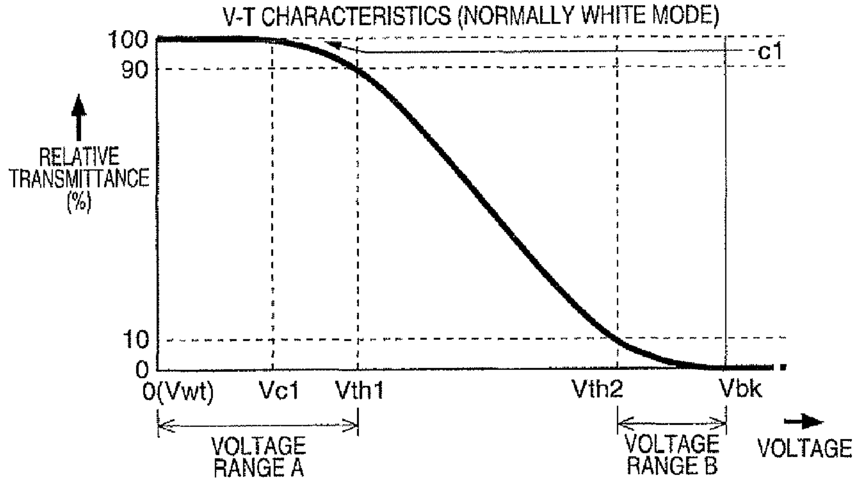

Therefore, when the TN-mode liquid crystal 105 and the normally white mode are employed, the relationship between the applied voltage and transmittance of the liquid crystal element 120 is represented by V-T characteristics as shown in FIG. 4B, in which the transmittance decreases as the applied voltage increases. However, similarly to the normally black mode, liquid crystal molecules become unstable when the applied voltage to the liquid crystal element 120 is below the voltage Vc.

Figure 23A:
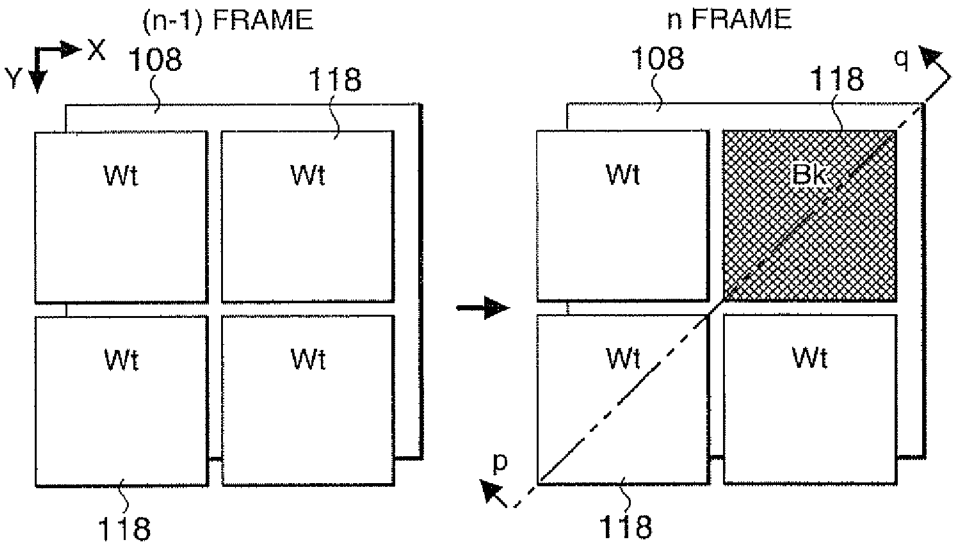
FIGS. 23A to 23C are explanatory views of reverse tilt that occurs in the liquid crystal panel.
Figure 23B:
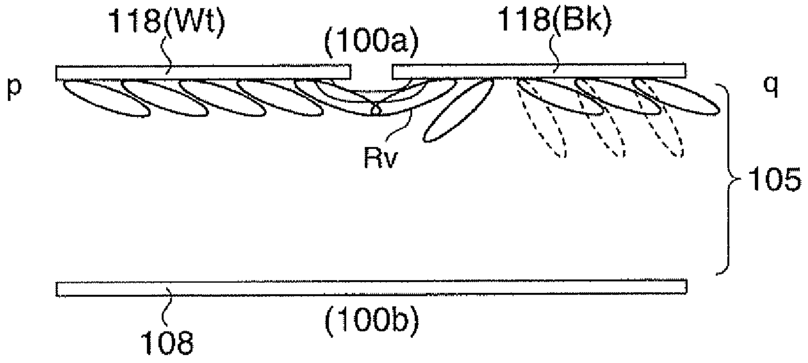

In the normally white mode in the TN mode, it is assumed as shown in FIG. 23A that, in a state where all 2×2=4 pixels are white pixels whose liquid crystal molecules are unstable in the (n−1) frame, only one pixel at the upper right corner is changed to a black pixel in the n frame. In the normally white mode as described above, the potential difference between the pixel electrode 118 and the common electrode 108 is greater in a black pixel than in a white pixel, contrary to the normally black mode. Therefore, in the upper right pixel that is changed from white to black as shown in FIG. 23B, liquid crystal molecules attempt to rise in a direction (direction perpendicular to the substrate surface) along the electric field direction, attempting to change from a state shown by solid lines to a state shown by broken lines.

However, the potential difference generated in the gap between the pixel electrode 118 (Wt) of a white pixel and the pixel electrode 118 (Bk) of a black pixel is substantially the same as that generated between the pixel electrode 118 (Bk) of a black pixel and the common electrode 108, and in addition, the gap between the pixel electrodes is narrower than that between the pixel electrode 118 and the common electrode 108. Therefore, when compared in terms of the intensity of electric field, the lateral electric field generated in the gap between the pixel electrode 118 (Wt) and the pixel electrode 118 (Bk) is stronger than the vertical electric field generated in the gap between the pixel electrode 118 (Bk) and the common electrode 108.

Since the upper right pixel is a white pixel whose liquid crystal molecules are unstable in the (n−1) frame, it takes time for the liquid crystal molecules to rise according to the intensity of the vertical electric field. On the other hand, the lateral electric field from the next pixel electrode 118 (Wt) is stronger than the vertical electric field induced by applying a voltage at black level to the pixel electrode 118 (Bk). Therefore, in the pixel to be changed to black as shown in FIG. 23B, the liquid crystal molecule Rv on the side next to a white pixel is brought into the reverse tilt state earlier than the other liquid crystal molecules that attempt to rise according to the vertical electric field.

Figure 23C:
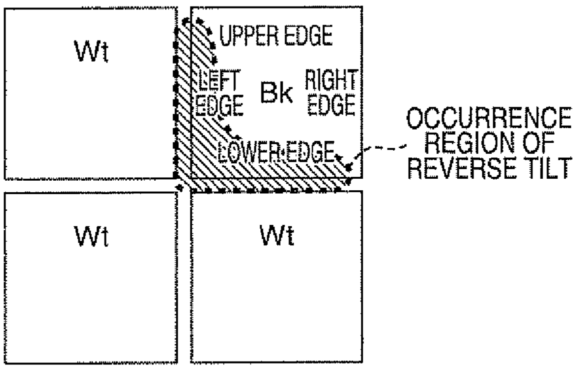

The liquid crystal molecule Rv that has been earlier brought into the reverse tilt state adversely affects the movement of the other liquid crystal molecules that attempt to rise in the direction perpendicular to the substrate surface according to the vertical electric field as shown by broken lines. Therefore, as shown in FIG. 23C, a region where the reverse tilt occurs in the pixel that should be changed to black does not stay within the gap between a pixel that should be changed to black and a white pixel, but expands from the gap over a wide range so as to erode the pixel that should be changed to black.

Accordingly, in the case where white pixels are positioned in the vicinity of an attention pixel to be changed to black, when the white pixels are next to the lower left and left of, and below the attention pixel, a reverse tilt domain is generated on the left-edge side and lower-edge side of the attention pixel.

Figure 24A:
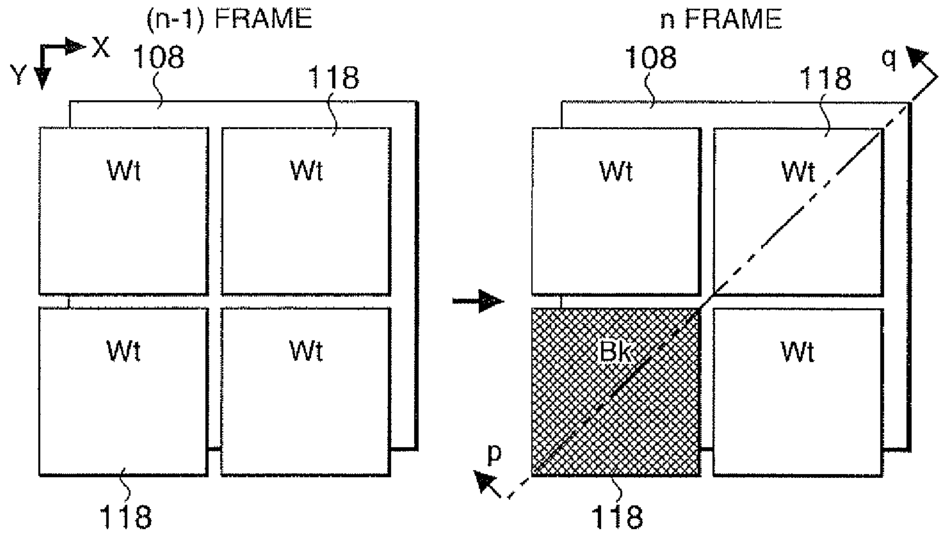
FIGS. 24A to 24C are explanatory views of reverse tilt that occurs in the liquid crystal panel.
Figure 24B:
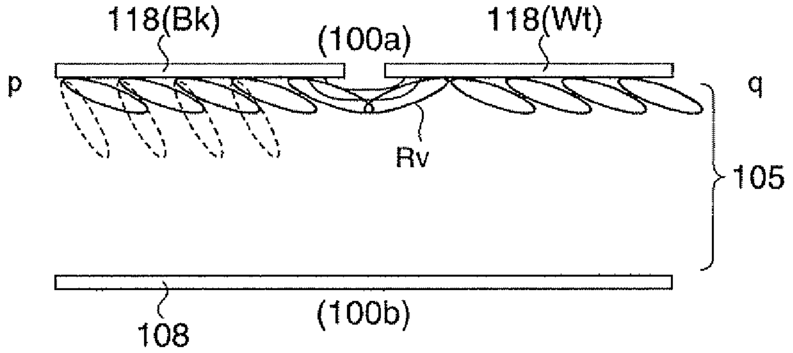
Figure 24C:
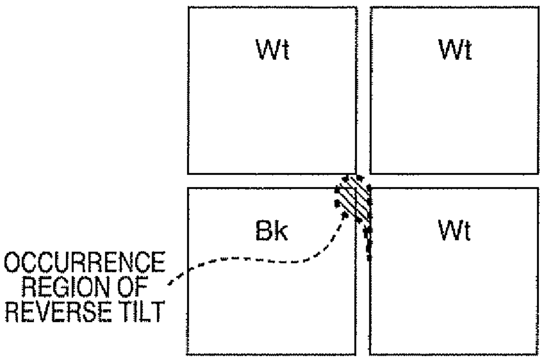

On the other hand, it is assumed as shown in FIG. 24A that, in a state where all 2×2=4 pixels are white pixels whose liquid crystal molecules are unstable in the (n−1) frame, only one pixel at the lower left corner is changed to a black pixel in the n frame. Also in this change, in the gap between the pixel electrode 118 (Bk) of a black pixel and the pixel electrode 118 (Wt) of a white pixel, a lateral electric field stronger than a vertical electric field in the gap between the pixel electrode 118 (Bk) and the common electrode 108 is generated. With the lateral electric field as shown in FIG. 24B, the liquid crystal molecule Rv in a white pixel and on the side next to a black pixel changes in alignment earlier than the other liquid crystal molecules that attempt to rise according to the vertical electric field, and is brought into the reverse tilt state. In the white pixel, however, since the intensity of the vertical electric field does not change from the (n−1) frame, the liquid crystal molecule Rv has little influence on the other liquid crystal molecules. Therefore, the region where the reverse tilt occurs in the pixel that is not changed from a white pixel is so narrow that it can be ignored as shown in FIG. 24C, compared to the example of FIG. 23C.

Moreover, in the lower left pixel that is changed from white to black among the 2×2=4 pixels, the initial alignment direction of liquid crystal molecules is less likely to be affected by the lateral electric field. Therefore, even when the vertical electric field is added, there are few liquid crystal molecules that are brought into the reverse tilt state. Therefore, in the lower left pixel, as the intensity of the vertical electric field increases, liquid crystal molecules correctly rise in the direction perpendicular to the substrate surface as shown by broken lines in FIG. 24B. As a result, since the lower left pixel is changed to an intended black pixel, display quality is not degraded.

That is, the reverse tilt domain generated when the tilt azimuthal angle θb is 45 degrees in the normally white mode in the TN mode is similar to that generated when the tilt azimuthal angle θb is 225 degrees in the normally black mode in the VA mode (refer to FIGS. 18A and 18B and FIGS. 19A to 19D), except that the white-black relationship relative to voltage (V-T characteristics) is reversed.

Figure 25A:
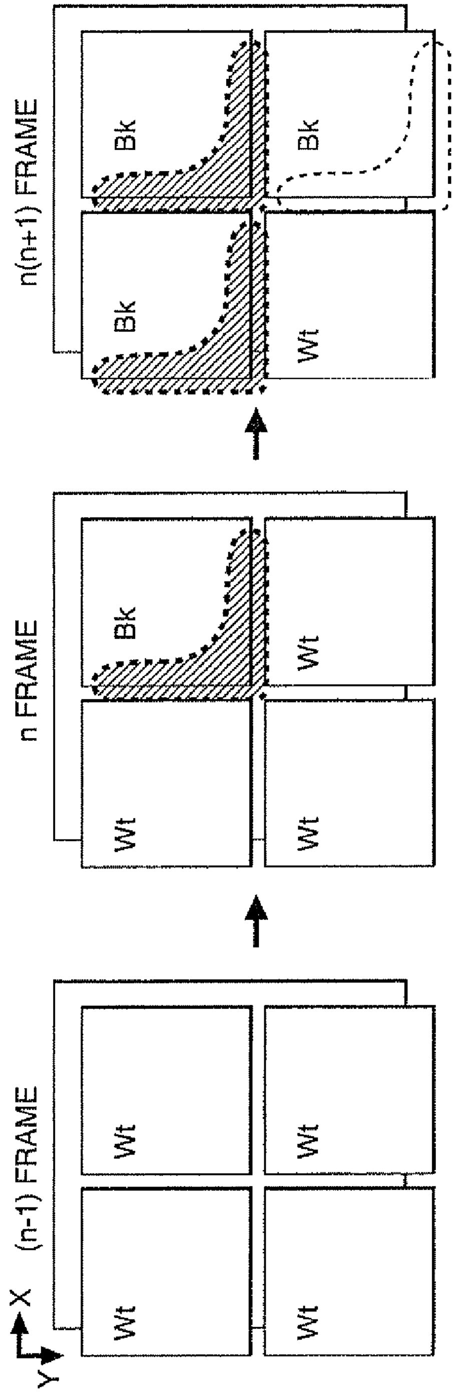
FIGS. 25A and 25B are explanatory views of reverse tilt that occurs in the liquid crystal panel.
Figure 25B:
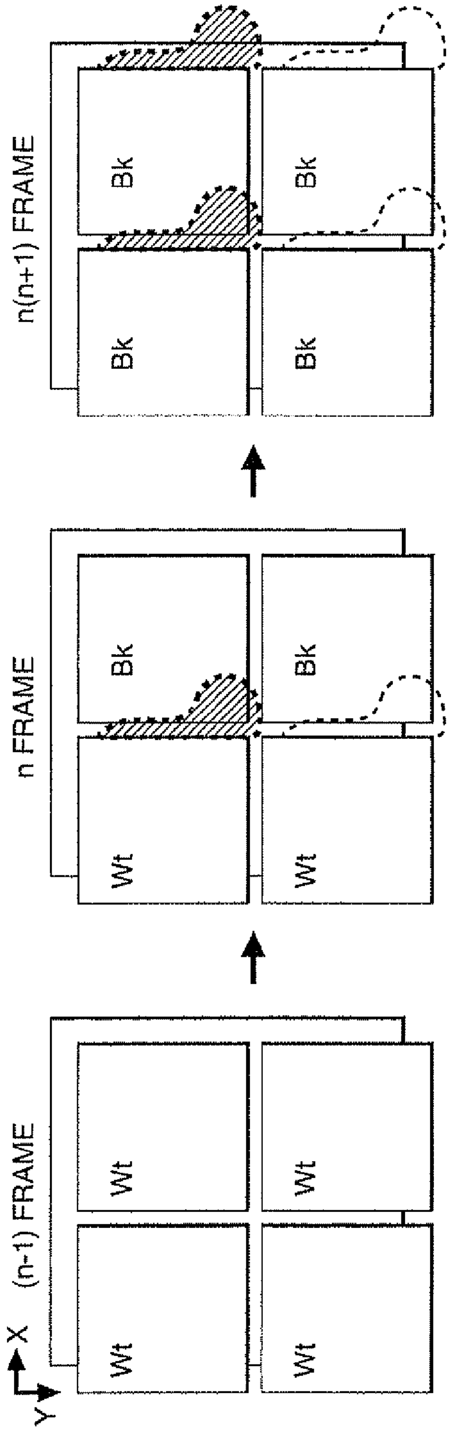

Therefore, even in the case where the study is made from a viewpoint of minimizing the number of pixels serving as display artifacts when the tilt azimuthal angle θb is 45 degrees in the TN mode, the following can be drawn based on the contents shown in FIGS. 25A and 25B and analogy with the VA mode.

That is, a process is performed such that, when the tilt azimuthal angle θb is 45 degrees in the normally white mode in the TN mode, in boundaries each at which a bright pixel (low-voltage side pixel) and a dark pixel (high-voltage side pixel) are next to each other in an image represented by the video signals Vid-in in the n frame, a portion of the boundaries where a bright pixel is positioned above and a dark pixel is positioned below and a portion thereof where a bright pixel is positioned to the right and a dark pixel is positioned to the left are each detected as a risk boundary; and, in the bright pixels adjacent to the risk boundaries, a voltage not causing liquid crystal molecules to become unstable is applied to a liquid crystal element of a bright pixel that is surrounded by the risk boundaries at two edges (upper and right edges).

In this example, the case where the tilt azimuthal angle θb is 45 degrees in the normally white mode in the TN mode has been described. However, considering that the generation direction of a reverse tilt domain is opposite from that in the VA mode, and that the V-T characteristics are different therefrom, measures when the tilt azimuthal angle θb is other than degrees and the configuration therefor can also be analogized easily from the above description.

Although, in the above description, the video signal Vid-in specifies the gray-scale level of a pixel, the video signal Vid-in may directly specify a voltage to be applied to a liquid crystal element. When the video signal Vid-in specifies the voltage to be applied to a liquid crystal element, a boundary may be determined based on a specified applied voltage to thereby correct a voltage.

The liquid crystal element 120 is not limited to a transmissive one, but may be a reflective one.

Although the pixels have been described as those representing shading from white to black, a color of one dot may be represented by three pixels colored with respective color filters for R (red), G (greed), and B (blue), for example. A projector described below is configured to combine primary color images produced by three liquid crystal panels to form a color image.

Electronic Apparatus

Figure 26:
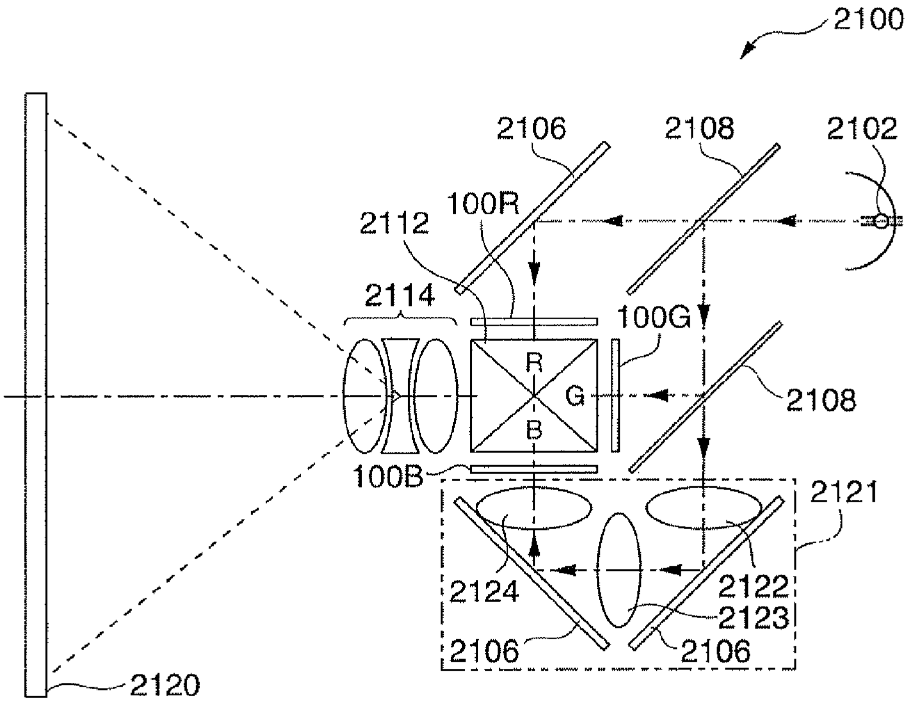
FIG. 26 shows a projector to which the liquid crystal display device is applied.

As an example of an electronic apparatus using the liquid crystal display device according to the embodiment, a projector using the liquid crystal panel 100 as a light valve will be next described. FIG. 26 is a plan view showing the configuration of the projector.

As shown in the drawing, a lamp unit 2102 including a white light source such as a halogen lamp is disposed inside the projector 2100. Projection light emitted from the lamp unit 2102 is separated into three primary colors of R (red) color, G (green) color, and B (blue) color through three mirrors 2106 and two dichroic mirrors 2108 arranged inside the projector, and the separated lights are guided to light valves 100R, 100G, and 100B corresponding to respective primary colors. Since the B-color light has an optical path longer than those of the R-color and G-color lights, the B-color light is guided through a relay lens system 2121 including an incident lens 2122, a relay lens 2123, and an exit lens 2124 for preventing optical loss.

In the projector 2100, three liquid crystal display devices each including the liquid crystal panel 100 are disposed so as to correspond to the respective R, G, and B colors. The configuration of each of the light valves 100R, 100G, and 100B is similar to that of the liquid crystal panel 100. Video signals that specify gray-scale levels of primary color components of respective R, G, and B colors are supplied from an external higher-level circuit to drive the light valves 100R, 100G, and 100B.

Lights modulated respectively by the light valves 100R, 100G, and 100B are incident on a dichroic prism 2112 in three directions. In the dichroic prism 2112, the R-color and B-color lights are refracted at 90 degrees, while the G-color light goes straight. Accordingly, images of respective primary colors are combined, and then a color image is projected onto a screen 2120 by a projection lens 2114.

Since lights corresponding to respective primary colors of R, G, and B are incident on the light valves 100R, 100G, and 100B by the dichroic mirrors 2108, there is no need to provide color filters. Transmission images of the light valves 100R and 100E are reflected by the dichroic prism 2112 and then projected, while a transmission image of the light valve 100G is projected as it is. Therefore, the horizontal scanning directions by the light valves 100R and 100B are opposite to the horizontal scanning direction by the light valve 100G to thereby display a mirror image.

An example of using the liquid crystal panel 100 as a light valve includes a rear-projection television set in addition to the projector described with reference to FIG. 26. The liquid crystal panel 100 is also applicable to mirrorless digital cameras with interchangeable lenses or electronic view finders (EVFs) in video cameras and the like.

In addition, examples of applicable electronic apparatuses include head mount displays, car navigation systems, pagers, electronic notebooks, calculators, word processors, workstations, videophone, POS terminals, digital still cameras, mobile phones, and apparatuses provided with a touch panel. The liquid crystal display device is of course applicable to the various electronic apparatuses.

The entire disclosure of Japanese Patent Application No. 2010-012885, filed Jan. 25, 2010 is expressly incorporated by reference herein.

What is claimed is:

1. A video processing circuit for a liquid crystal panel including at least a first pixel, a second pixel and a third pixel, the second pixel disposed at a position adjacent to the first pixel in a first direction, and the third pixel disposed at a position adjacent to the first pixel in a second direction that intersects the first direction, the video processing circuit comprising:

an output unit that outputs a first voltage based on a first video signal corresponding to the first pixel, a second voltage based on a second video signal corresponding to the second pixel and a third voltage based on a third video signal corresponding to the third pixel;

wherein when (1) the first voltage is lower than a first threshold voltage and (2) the second and third voltages are higher than a second threshold voltage that is higher than the first threshold voltage, the output unit is configured to output a first corrected voltage instead of the first voltage, wherein the first corrected voltage has a value between the first voltage and the first threshold voltage.

2. The video processing circuit according to claim 1, wherein the first corrected voltage is a voltage that gives an initial tilt angle to a liquid crystal element.

3. The video processing circuit according to claim 1, wherein the first and second directions are directions that are determined by a tilt azimuth of a liquid crystal element.

4. The video processing circuit according to claim 1, wherein the output unit is configured to output the first voltage except when the first voltage is lower than the first threshold voltage and the second and third voltages are higher than the second threshold voltage.

5. A liquid crystal display device comprising:

at least a first pixel, a second pixel and a third pixel, the second pixel disposed at a position adjacent to the first pixel in a first direction, and the third pixel disposed at a position adjacent to the first pixel in a second direction that intersects the first direction; and a video processing circuit that outputs a first voltage based on a first video signal corresponding to the first pixel, a second voltage based on a second video signal corresponding to the second pixel and a third voltage based on a third video signal corresponding to the third pixel;

wherein when (1) the first voltage is lower than a first threshold voltage and (2) the second and third voltages are higher than a second threshold voltage that is higher than the first threshold voltage, the output unit is configured to output a first corrected voltage instead of the first voltage, wherein the first corrected voltage has a value between the first voltage and the first threshold voltage.

6. An electronic apparatus comprising the liquid crystal display device according to claim 5.

* * * * *